United States Patent
Lee et al.

(10) Patent No.: US 10,237,704 B2
(45) Date of Patent: Mar. 19, 2019

(54) SERVICE IMPLEMENTATION METHOD AND APPARATUS IN WIRELESS COMMUNICATION SYSTEM

(71) Applicant: Samsung Electronics Co., Ltd., Suwon-si, Gyeonggi-do (KR)

(72) Inventors: Hoyeon Lee, Hwaseong-si (KR); Sangsoo Jeong, Suwon-si (KR); Sunghoon Kim, Suwon-si (KR); Erik Guttman, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/179,429

(22) Filed: Jun. 10, 2016

(65) Prior Publication Data

US 2016/0366567 A1  Dec. 15, 2016

(30) Foreign Application Priority Data

Jun. 15, 2015 (KR) .................... 10-2015-0084485

(51) Int. Cl.
*H04W 4/00* (2018.01)
*H04W 4/10* (2009.01)
*H04W 76/12* (2018.01)
*H04L 29/06* (2006.01)
*H04W 76/50* (2018.01)
*H04W 76/34* (2018.01)
*H04W 76/15* (2018.01)

(52) U.S. Cl.
CPC ............ *H04W 4/10* (2013.01); *H04W 76/12* (2018.02); *H04L 65/1006* (2013.01); *H04L 65/1069* (2013.01); *H04W 76/15* (2018.02); *H04W 76/34* (2018.02); *H04W 76/50* (2018.02)

(58) Field of Classification Search
None
See application file for complete search history.

(56) References Cited

U.S. PATENT DOCUMENTS 7,477,911 B1     1/2009  Praveen et al.
7,769,404 B1 *   8/2010  Choksi .................... H04W 4/10
                                                455/518

(Continued)

FOREIGN PATENT DOCUMENTS

EP    2 106 047 A2    9/2009
WO    2005/018201 A1  2/2005

OTHER PUBLICATIONS

3rd Generation Partnership Project; Technical Specification Group Services and System Aspects; Study on application architecture to support Mission Critical Push to Talk over LTE (MCPTT) services (Release 13), 3GPP TR 23.779 V1.0.0, Jun. 9, 2015.

*Primary Examiner* — Bob A Phunkulh
(74) *Attorney, Agent, or Firm* — Jefferson IP Law, LLP

(57) ABSTRACT

A unidirectional service implementation method and an apparatus for transmitting media content collected by a terminal in a wireless communication system are provided. The unidirectional service implementation method includes registering with a server by transmitting a registration message, transmitting a first unidirectional service request message including information requesting a first unidirectional service, and establishing a first session based on the first unidirectional service request message.

15 Claims, 22 Drawing Sheets

(56) References Cited

U.S. PATENT DOCUMENTS

| | | | |
|---|---|---|---|
| 8,150,334 B2* | 4/2012 | Albertsson | H04W 4/10 455/90.2 |
| 8,463,307 B1 | 6/2013 | Zhou et al. | |
| 2005/0041617 A1 | 2/2005 | Huotari et al. | |
| 2005/0202819 A1 | 9/2005 | Blicker | |
| 2006/0084454 A1* | 4/2006 | Sung | H04W 4/10 455/518 |
| 2006/0168640 A1* | 7/2006 | Anttila | H04H 20/93 725/135 |
| 2006/0205430 A1* | 9/2006 | Park | H04W 4/10 455/518 |
| 2007/0002779 A1* | 1/2007 | Lee | H04W 4/10 370/260 |
| 2007/0133484 A1* | 6/2007 | Albal | H04W 72/005 370/338 |
| 2007/0281681 A1* | 12/2007 | Holm | B66B 1/40 455/422.1 |
| 2008/0037574 A1* | 2/2008 | Huh | H04L 65/4061 370/416 |
| 2008/0200198 A1* | 8/2008 | Zhang | H04W 4/10 455/518 |
| 2008/0248826 A1* | 10/2008 | Holm | H04W 84/08 455/518 |
| 2008/0274762 A1* | 11/2008 | Wu | H04W 4/10 455/518 |
| 2009/0248880 A1 | 10/2009 | Kim | |
| 2010/0248742 A1* | 9/2010 | Song | H04L 12/185 455/456.1 |
| 2014/0230047 A1* | 8/2014 | Scully-Power | G06F 21/32 726/19 |
| 2015/0079919 A1* | 3/2015 | Shahaf | H04M 3/568 455/404.1 |
| 2016/0344726 A1* | 11/2016 | Stojanovski | H04W 76/14 |

* cited by examiner

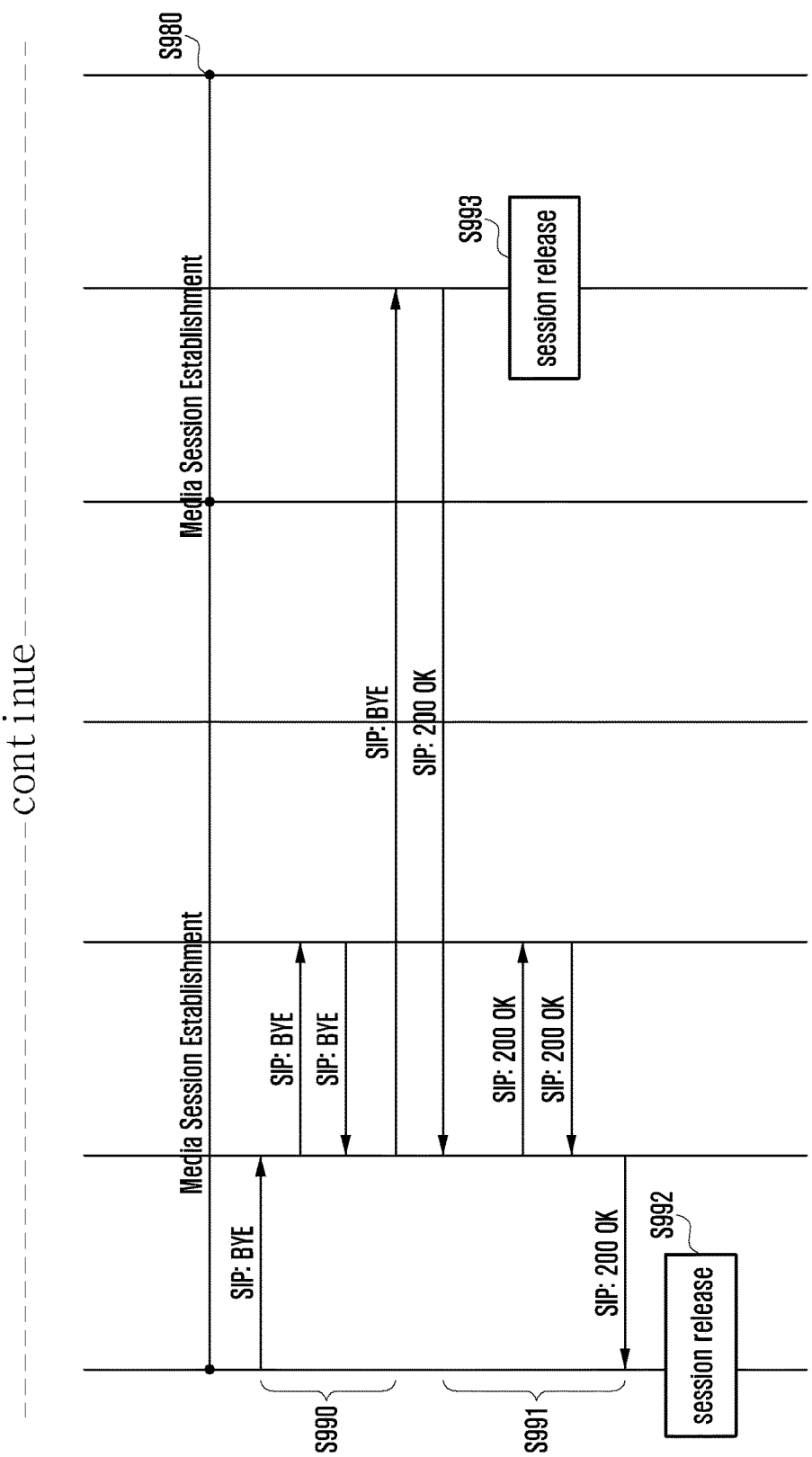

SERVICE IMPLEMENTATION METHOD AND APPARATUS IN WIRELESS COMMUNICATION SYSTEM

CROSS-REFERENCE TO RELATED APPLICATION(S)

This application claims the benefit under 35 U.S.C. § 119(a) of a Korean patent application filed on Jun. 15, 2015 in the Korean Intellectual Property Office and assigned Serial number 10-2015-0084485, the entire disclosure of which is hereby incorporated by reference.

TECHNICAL FIELD

The present disclosure relates to a service implementation method for use in a wireless communication system. More particularly, the present disclosure relates to a method and apparatus for transmitting media content collected by a terminal in a wireless communication system.

BACKGROUND

In order to meet the increasing wireless data traffic demand since the commercialization of $4^{th}$ generation (4G) communication systems, the development focus is on the $5^{th}$ generation (5G) or pre-5G communication system. For this reason, the 5G or pre-5G communication system is called beyond 4G network communication system or post long term evolution (LTE) system. In order to accomplish high data rates, consideration is being given to implementing the 5G communication system on the millimeter wave (mm Wave) band (e.g., 60 GHz band). In order to mitigate propagation loss and increase propagation distance, the 5G communication system is likely to accommodate various techniques such as beamforming, massive multiple input multiple output (MIMO), full dimensional MIMO (FD-MIMO), array antenna, analog beamforming, and large scale antenna. Also, for throughput enhancement of the 5G communication system, research is being conducted on various techniques such as small cell, advanced small cell, cloud radio access network (cloud RAN), ultra-dense network, device to device communication (D2D), wireless backhaul, moving network, cooperative communication, coordinated multi-points (CoMP), and interference cancellation. Furthermore, the ongoing research includes the use of hybrid frequency shift keying (hybrid FSK) and quadrature amplitude modulation (QAM) and sliding window superposition coding (SWSC) as advanced coding modulation (ACM), filter bank multi carrier (FBMC), non-orthogonal multiple access (NOMA), and sparse code multiple access (SCMA).

Meanwhile, the internet is evolving from a human-centric communication network in which information is generated and consumed by humans to the internet of things (IoT) in which distributed things or components exchange and process information. The combination of the cloud server-based big data processing technology and the IoT begets internet of everything technology. In order to secure the sensing technology, wired/wireless communication and network infrastructure, service interface technology, and security technology required for implementing the IoT, recent research has focused on the sensor network, machine to machine (M2M), and machine type communication (MTC) technologies. In the IoT environment, it is possible to provide an intelligent internet technology (IT) that is capable of collecting and analyzing data generated from connected things to create new values for human life. The IoT can be applied to various fields such as a smart home, a smart building, a smart city, a smart car or a connected car, a smart grid, health care, a smart appliance, and a smart medical service through legacy IT and convergence of various industries.

Thus, there are various attempts to apply the IoT to the 5G communication system. For example, the sensor network, M2M, and MTC technologies are implemented by means of the 5G communication technologies such as beamforming, MIMO, and an array antenna. The application of the aforementioned cloud RAN as a big data processing technology is an example of convergence between the 5G and IoT technologies.

Meanwhile, public safety LTE (PS-LTE) provides a user with a communication service for public safety in a disaster situation using mission critical push to talk (MCPTT) over LTE.

For this purpose, a terminal can be configured to acquire media content on its surroundings in an emergency situation and transmit the media content to an emergency situation manager as help.

There is therefore a need of a method for acquiring media content on the surroundings of the terminal in an emergency situation and transmitting the media content to an emergency situation manager.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting to an emergency situation manager the media contents collected by the terminal.

In accordance with an aspect of the present disclosure, a unidirectional service implementation method of a terminal in a communication system is provided. The unidirectional service implementation method includes registering with a server by transmitting a registration message, transmitting a unidirectional service request message including information requesting a unidirectional service, and establishing a first session based on the unidirectional service request message.

In accordance with another aspect of the present disclosure, a terminal for performing a unidirectional service in a communication service is provided. The terminal includes a transceiver for communication with other network entities and a controller which controls registering with a server by transmitting a registration message, transmitting a unidirectional service request message including information requesting a unidirectional service, and establishing a first session based on the unidirectional service request message.

In accordance with another aspect of the present disclosure, a unidirectional service implementation method of a server in a communication system is provided. The unidirectional service implementation method includes receiving a unidirectional service request message including information requesting a unidirectional service from a first terminal, performing authority authentication to determine whether the first terminal has a unidirectional service capability, and transmitting, when the authority authentication is successful, a message for establishing a first session between the first terminal and a second terminal.

In accordance with another aspect of the present disclosure, a server for a unidirectional service in a communication system is provided. The server includes a transceiver for communication with other network entities and a controller which controls receiving a unidirectional service request message including information requesting a unidirectional service from a first terminal, performing authority authentication to determine whether the first terminal has a unidirectional service capability, and transmitting, when the authority authentication is successful, a message for establishing a first session between the first terminal and a second terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A and 9B are a signal flow diagram illustrating a procedure of accepting a service request received during an ongoing unidirectional service according to various embodiments of the present disclosure;

The same reference numerals are used to represent the same elements throughout the drawings.

DETAILED DESCRIPTION

Figure 1:
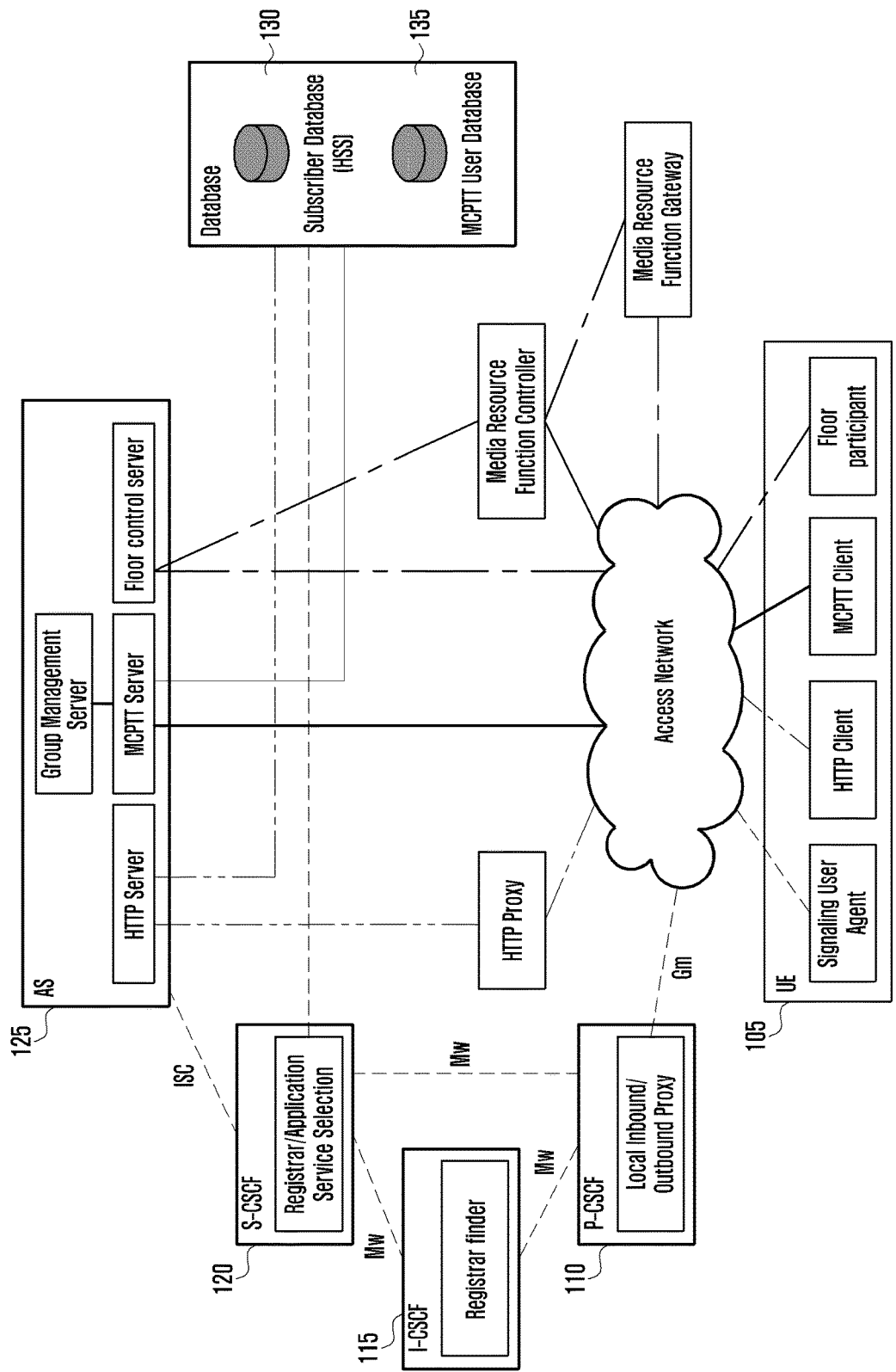
FIG. 1 is a diagram illustrating a mission critical push to talk (MCPTT) system architecture according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following disclosure, some elements are exaggerated, omitted, or simplified in the drawings and in practice the elements may have sizes and/or shapes different from those shown in the drawings.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to the functions thereof.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

FIG. 1 is a diagram illustrating a mission critical push to talk (MCPTT) system architecture according to an embodiment of the present disclosure.

Referring to FIG. 1, the MCPTT system includes a user equipment (UE) 105, session initiation protocol (SIP) core entities 110, 115, and 120, an MCPTT application server (MCPTT AS) 125, and databases (DBs) 130 and 135.

The DBs may include a home subscriber server (HSS) DB (HSS DB) 130 as an SIP core DB and an MCPTT user DB 135. The HSS DB 130 and the MCPTT user DB 135 may store user information.

The UE 105 connects to an external network via the SIP core entity 110 to provide the user with the MCPTT service. In more detail, the UE 105 may connect to the MCPTT AS 125 via the SIP core entities 110, 115, and 120 for communication with the external network. In the following description, the term "UE" is interchangeably used with the terms "terminal" and "MCPTT terminal".

MCPTT terminals may be classified as an (unofficial) typical MCPTT terminal, an official MCPTT terminal, and an official MCPTT service provider.

The MCPTT terminal may receive the MCPTT service from multiple MCPTT service providers. The MCPTT terminal is capable of performing a group communication or peer-to-peer communication in connection with a certain MCPTT service provider having a partnership in addition to the main MCPTT service provider of the MCPTT terminal.

The MCPTT terminal may receive basic information concerning the MCPTT service from the MCPTT service provider. The basic information may include a user identifier, a group identifier, an intra-group role and allowed call type, a peer-to-peer call capability, an arrangement type, information to be reported to the MCPTT server, and information for connecting to Encapsulated PostScript (EPS), SIP core, and MCPTT AS to support various arrangement types.

The MCPTT AS 125 may provide users with a disaster situation or public safety communication service including a group call function, a peer-to-peer call, an emergency call, a disaster alert, and a UE-collected surrounding media content transmission function.

In more detail, the MCPTT service may be categorized into a group call, a peer-to-peer call, and an emergency alert.

The group call may support a normal group call for group communication for public safety, an emergency call served with priority in an urgent/emergency situation, and an imminent peril call served for group communication in an imminent/emergency situation with a priority lower than that of the emergency call.

The peer-to-peer call may support a normal and an emergency call service and a media content transmission service capable of transmitting/receiving the surrounding media content collected by the UE. The media content transmission service according to an embodiment of the present disclosure is characterized in that the media content is transmitted in one direction unlike the legacy normal call and emergency call. That is, the calling UE may only transmit the media content, and the called UE may only receive the media content. In the following description, such a unidirectional media content transmission service is interchangeably referred to as ambient listening. The media content transmitted unidirectionally may include sound and image surrounding the UE of the counterpart. The unidirectional service may be started by the calling party or a manager who wants to receive the media content.

The MCPTT service may be provided by the UE, the evolved packet system (EPS), the SIP core, and the MCPTT AS. At this time, the EPS may denote a long term evolution (LTE) network, and the SIP core may be a network entity using SIP such as an internet protocol (IP) multimedia subsystem (IMS). That is, the MCPTT service may be provided through the LTE network and IMS network.

The MCPTT service may be divided into a group management function, a session control function, and a media transmission control function.

The group management function may include managing subscription information of the group to which the user belongs, priority of the group, role allowed in the group, and call type available in the group.

The session control function may include controlling signals concerning a call session such as registering the user with the MCPTT service and initiating, changing, or terminating a group communication.

The media transmission control function may include allowing for transmission/reception of media content concerning the group call, peer-to-peer call, and disaster alert and controlling resources. All media contents transmitted by the MCPTT UE are delivered to a counterpart UE through a media gateway provided by the MCPTT service.

The group management server for managing groups may co-located with the MCPTT AS and separated logically according to their functions.

The media gateway for controlling the media contents may connect to the UE, the EPS, and the MCPTT AS without involvement of the SIP core. The media gateway controls transmission/reception right of the user, and this control operation is referred to as floor control. The media gateway may be co-located with the MCPTT AS and they are responsible for logically separated functions.

The MCPTT service may be provided in various manners. The MCPTT provider may possess all of the EPS, SIP core, and MPTT AS, or just the SIP core and MCPTT AS interoperating with the EPS possessed by another provider. Also, the MCPTT provider may possess only the MCPTT AS interoperating with the EPS and SIP core possessed by another provider.

The UE 105 and the MCPTT AS 125 may use an IMS communication service identifier (ICSI) and/or an IMS application reference identifier (IARI) for the unidirectional service. The UE 105 and the MCPTT AS 125 may define the MCPTT service or unidirectional service based on the ICSI. The UE 105 and the MCPTT AS 125 may also define the MCPTT service or unidirectional service based on the IARI. Accordingly, the UE 105 and the MCPTT AS 125 may use at least one or a combination of the ICSI and IARI to identify the unidirectional service.

Figure 2:
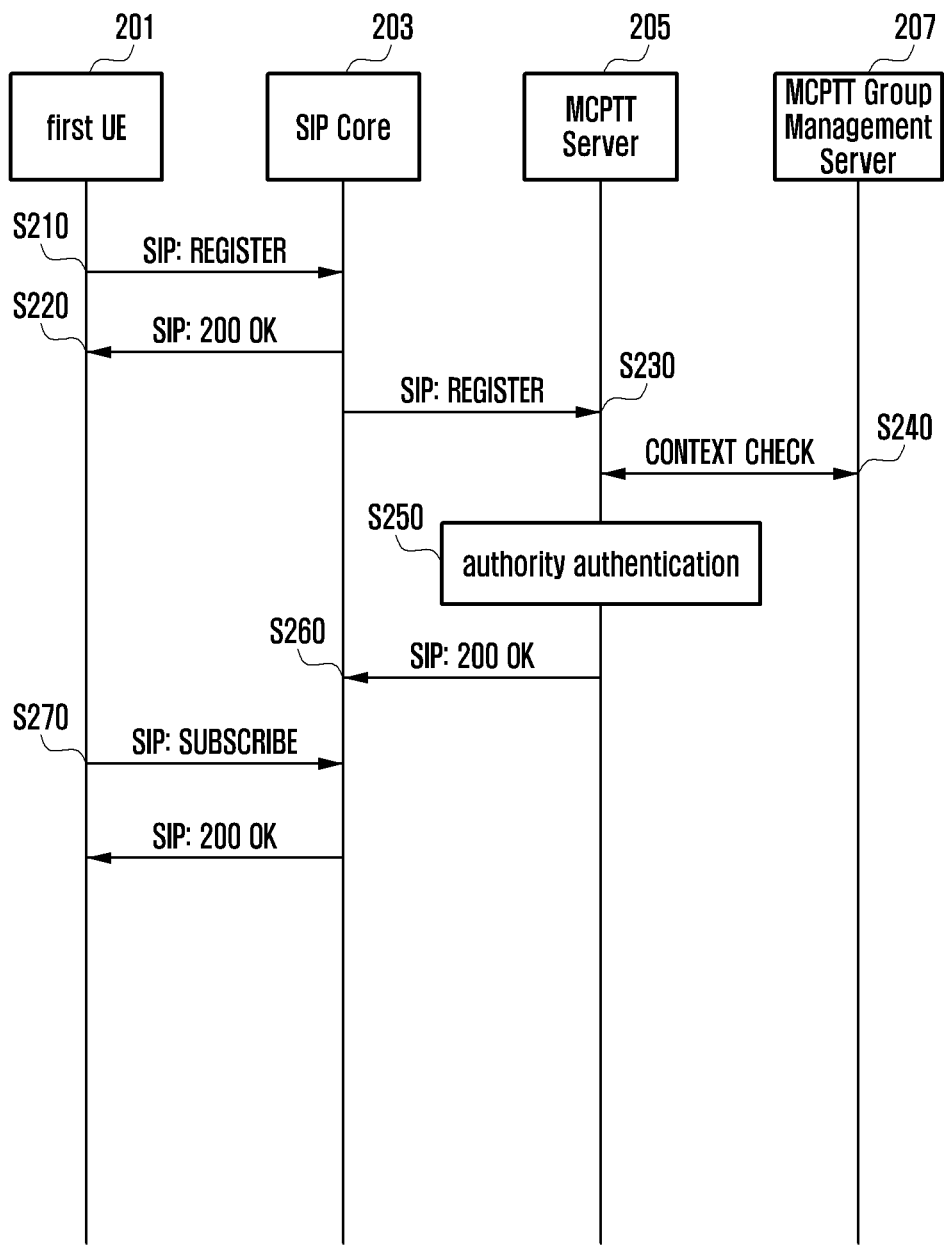
FIG. 2 is a signal flow diagram illustrating a procedure of registering a user equipment (UE) having a unidirectional service capability with a session initiation protocol (SIP) core and an MCPTT server according to an embodiment of the present disclosure.

FIG. 2 is a signal flow diagram illustrating a procedure of registering a UE having a unidirectional service capability with an SIP core and an MCPTT server according to an embodiment of the present disclosure.

Referring to FIG. 2, a UE 201 may send the SIP core 203 an SIP REGISTER message at operation S210 including at least one of ICSI and IARI indicating a unidirectional service for registration with the SIP core 203 and an MCPTT server 205. That is, the UE 201 may transmit the SIP REGISTER message to the SIP core 203 through the IMS network.

If the SIP REGISTER message is received, the SIP core 203 may send the UE 201 an SIP 200 OK message notifying of the receipt of the registration message at operation S220.

If the SIP REGISTER message is received, the SIP core 203 may forward the SIP REGISTER message to the MCPTT server 205 at operation S230. If the SIP REGISTER message is received, the MCPTT server 205 may check the UE information included in the SIP REGISTER message to determine whether to register the UE 201 with the server at operation S240.

Afterward, the MCPTT server 205 may perform authority authentication based on the information included in the SIP REGISTER message at operation S250. That is, the MCPTT server 205 may determine whether to register the UE 201 with the server depending on whether the UE 201 has the unidirectional service capability and has subscribed to the MCPTT service.

If it is determined to register the UE 201, the MCPTT server 205 may send the SIP core 203 an SIP 200 OK message at operation S260.

After the registration is completed, the UE 201 may send the SIP core 203 an SIP SUBSCRIBE message at operation S270.

Figure 3:
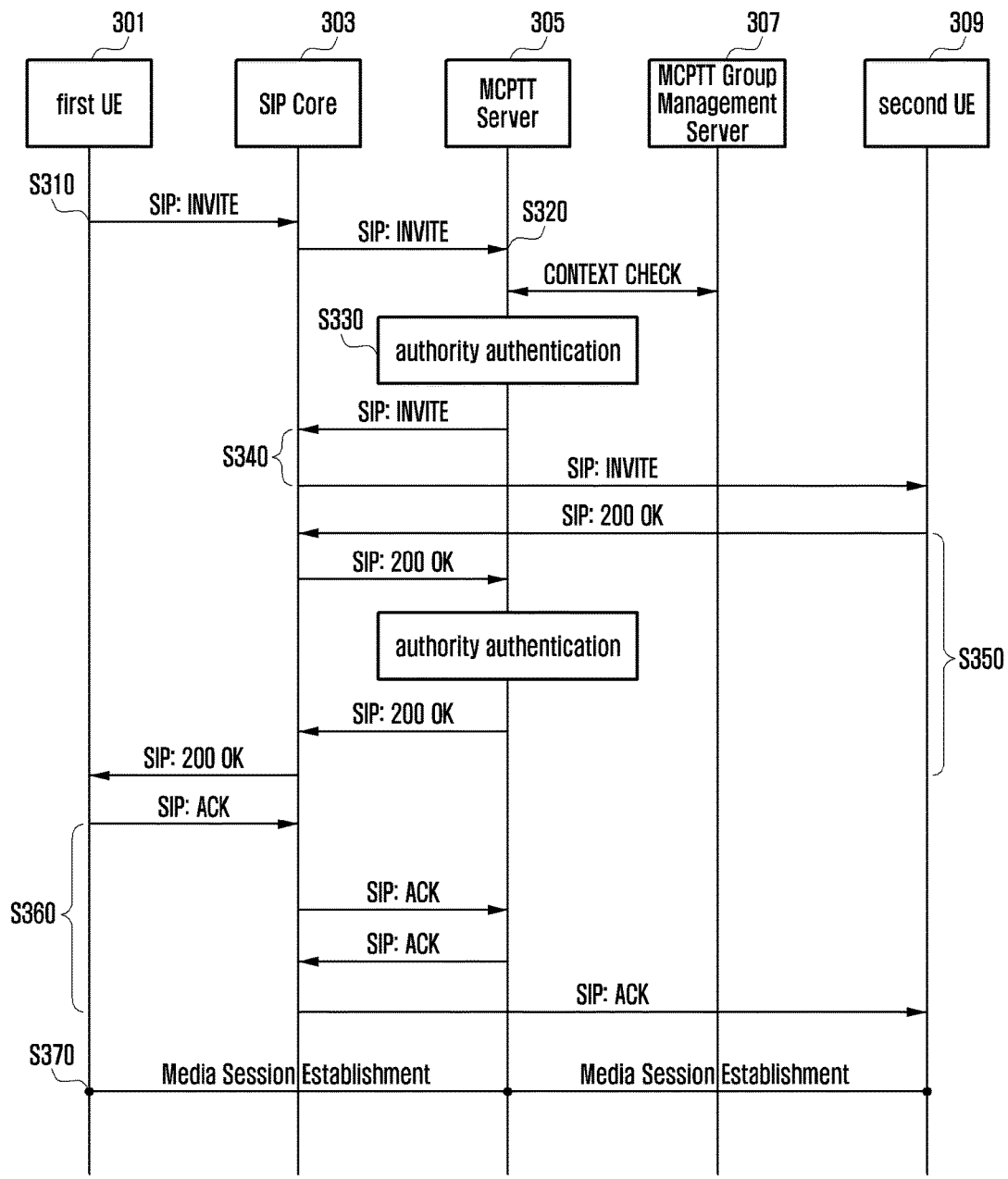
FIG. 3 is a signal flow diagram illustrating a calling UE-initiated unidirectional service initiation procedure according to an embodiment of the present disclosure.

FIG. 3 is a signal flow diagram illustrating a calling UE-initiated unidirectional service initiation procedure according to an embodiment of the present disclosure.

Referring to FIG. 3, the user may make an input through a user interface (UI) of a UE to initiate the unidirectional service. If unidirectional service necessity is detected by means of a sensor of the UE, the UE may initiate the unidirectional service according to an embodiment of the present disclosure.

In order to initiate the unidirectional service, the first UE 301 may send the SIP core 303 an SIP INVITE message at operation S310. At this time, the SIP INVITE message may include at least one of ICSI and IARI indicating the unidirectional service. The UE 301 may transmit the SIP INVITE message to the SIP core 203 through an IMS network.

In the drawing, the first UE 301 may be the UE of a user in an emergency situation.

The unidirectional service denotes a service for a first UE to transmit collected media content to a second UE through a unidirectional media path. At this time, the media content collected by the first UE may include ambient sound and images around the first UE. The unidirectional media path may be configured using one of the following two methods.

The first method is to configure a session description protocol (SDP) value of the SIP INVITE message at the first UE. In order to request the unidirectional service, the first UE may set the SDP to a=sendonly. That is, the first UE may transmit the INVITE message including the information instructing transmission only but no reception.

In the case that the second UE which is receiving the unidirectional service requests for the unidirectional service, the second UE sets the SDP to a=rcvonly in the SIP INVITE message. That is, the second UE may transmit the INVITE message including the information instructing reception only but no transmission.

The second method is to use a floor control function of a media gateway which controls the transmission/reception right of the user. As described above, the media gateway may be co-located with the MCPTT and responsible for a function separated logically.

The MCPTT AS may be configured to assign the flow control right to the MCPTT UE automatically based on the service user information and service information included in the SIP INVITE message and the SIP 200 OK message or in response to the request from the MCPTT UE such that only the MCPTT UE transmits media content. At this time, the media content may include all kinds of media objects (such as audio, video, texts, and files) transmittable by the MCPTT UE.

The UE may determine a condition for initiating the requested unidirectional service and include the condition in the INVITE message.

Meanwhile, a normal call service is initiated in response to a user's push on a call button appearing when an incoming call is received. However, the unidirectional service according to an embodiment of the present disclosure may be initiated in response to an explicit user action like hitting the call button or automatically upon receipt of a service request without explicit user action. This is called service commencement mode, and the service commencement mode may be configured as follows.

The service commencement mode may be categorized into a manual commencement mode in which the service commences upon user input in response to a service request (similar to the normal call service) and an automatic commencement mode in which the service commences upon receipt of the service request without any user input. The service commencement mode may be determined by the UE requesting the service.

Accordingly, the UE 301 may send the SIP core 303 the SIP INVITE message including the information about the service commencement mode. For example, the UE may add a predetermined header related to the service commencement mode to the message to be transmitted to the SIP core 303.

The service commencement mode may be determined by the UE which receives the service request. In the case that the UE which has received the service request determines the service commencement mode, the UE may have service-specific priorities so as to determine the service commencement mode depending on the service to be received.

The service commencement mode determination procedure is not limited to the unidirectional service but may be applied to the media content services capable of transmitting/receiving ambient media content of the counterpart in an emergency situation.

If the SIP INVITE message is received at operation S310, the SIP core 303 may forward the SIP INVITE message to the MCPTT server 305 at operation S320.

If the SIP INVITE message is received, the MCPTT server 305 may perform a context check with MCPTT group management server 307 and perform authority authentication to determine at operation S330 whether the UE that has requested the unidirectional service has the unidirectional service capability and service commencement mode configuration capability. For the authority authentication, the MCPTT server 305 may acquire basic information from the HSS-DB 130, the MCPTT user DB 135, and the SIP core. If the authority authentication is completed successfully, the MCPTT server 305 may forward the INVITE message to the second UE 309 via the SIP core 303 at operation S340.

The second UE 309 is a UE for performing the unidirectional service with the first UE 301. In FIG. 3, the second UE 309 may be a service manager for managing emergency situations. However, the second UE 309 is not limited to the service manager and may be a UE owned by the user.

If the INVITE message is received, the second UE 309 sends the first UE 301 an SIP 200 OK message via the SIP core 303 and the MCPTT server 305 to accept the unidirectional service request at operation S350.

If the SIP 200 OK message is received, the first UE 301 sends the second UE 309 an SIP acknowledgement (ACK) message via the SIP core 303 and the MCPTT server 305 to complete service commencement at operation S360. At this time, the SIP 200 OK message and SIP ACK message are transmitted through the same path as the SIP INVITE message. However, the messages may also be transmitted through a different path therefrom.

Afterward, a media session is established between the first and second UEs 301 and 309 at operation S370.

The unidirectional service may be initiated by the called UE which provides the ambient media content as well as the calling UE which receives the media content. The unidirectional service may also be automatically triggered by the calling UE which transmits the media content.

For example, the unidirectional service may automatically be triggered by a sensor of the UE owned by the user. The UE may be any of a smartphone, a tablet personal computer (PC), and a smart watch, and it may collect the current state information and ambient situation information of the user of the UE using various sensors such as a gyro sensor, a heart-beat pulse sensor, and temperature sensor. If a value corresponding to the collected information is greater than a predetermined threshold value, the unidirectional service is triggered automatically.

Figure 4:
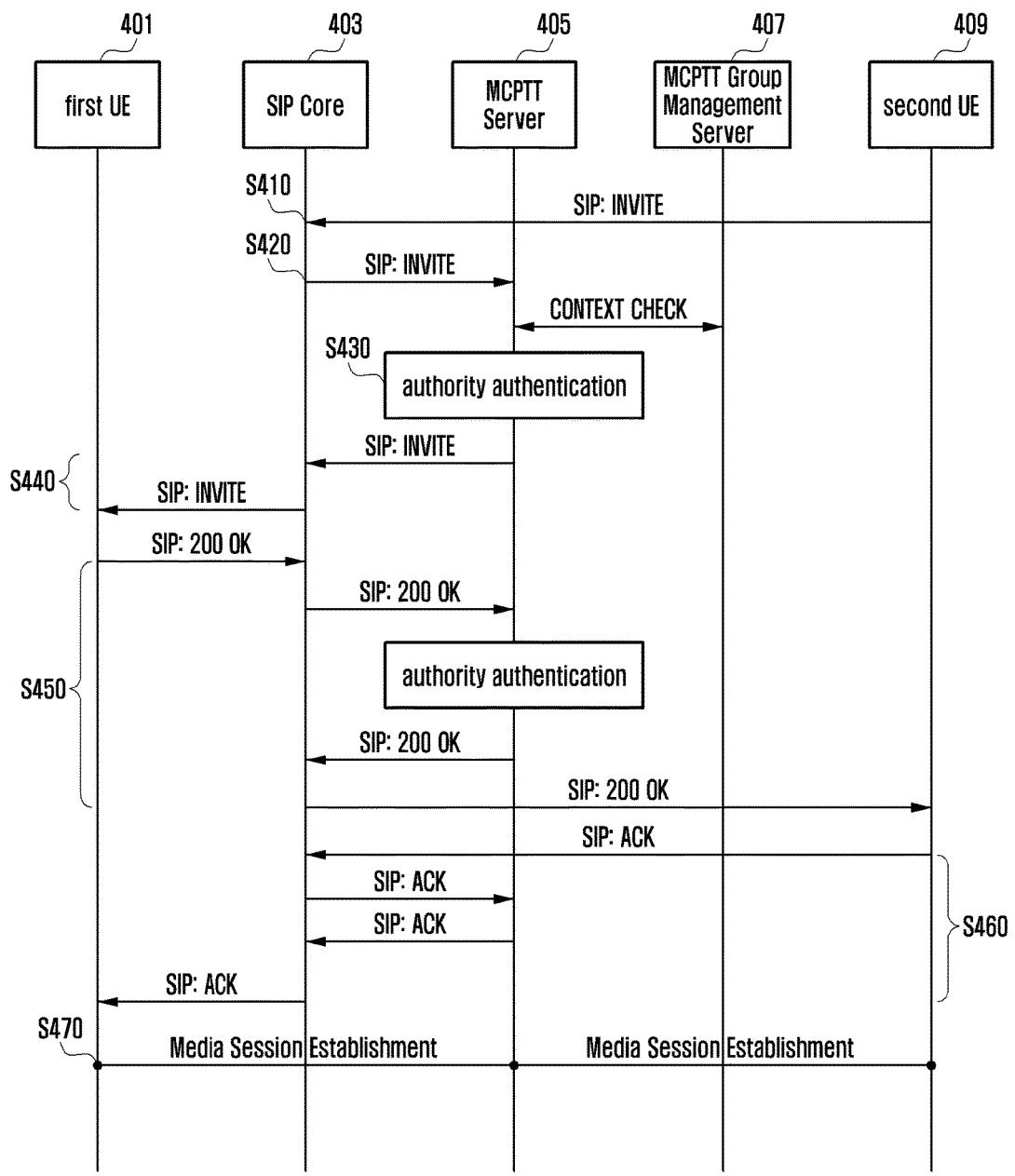
FIG. 4 is a signal flow diagram illustrating a called UE-initiated unidirectional service initiation procedure according to an embodiment of the present disclosure.

FIG. 4 is a signal flow diagram illustrating a called UE-initiated unidirectional service initiation procedure according to an embodiment of the present disclosure.

Referring to FIG. 4, a second UE 409 may send the SIP core 403 an SIP INVITE message to request the universal service at operation S410. At this time, the SIP INVITE message may include the information indicating that the requested service is the unidirectional service. That is, the second UE may set the SDP of the SIP INVITE message to a=rcvonly.

The SIP INVITE message may also include service commencement mode information. The service commencement mode has been described with reference to FIG. 3 and therefore a detailed description thereof is omitted herein.

If the SIP INVITE message is received, the SIP core 403 may forward the SIP INVITE message to the MCPTT server 405 at operation S420, and the MCPTT server 405 may perform a context check with MCPTT group management server 407 and perform authority authentication on the SIP INVITE message at operation S430.

If the service commencement mode information is not included in the SIP INVITE message, the MCPTT server 405 may determine the service commencement mode based on the user configuration value of the UE.

After performing the authority authentication, the MCPTT server 405 may send the first UE 401 the SIP INVITE message via the SIP core 403 at operation S440.

If the SIP INVITE message is received, the first UE 401 may send at operation S450 the second UE 409 an SIP 200 OK message via the SIP core 403 and the MCPTT server 405 to accept the unidirectional service request.

If the SIP 200 OK message is received, the second UE 409 sends the first UE 401 an SIP ACK message via the SIP core 403 and the MCPTT Server 405 to complete the service commencement at operation S460. At this time, the SIP 200 OK and ACK messages are transmitted through the same path as the SIP INVITE message. In operation S470, a media session is established.

Figure 5:
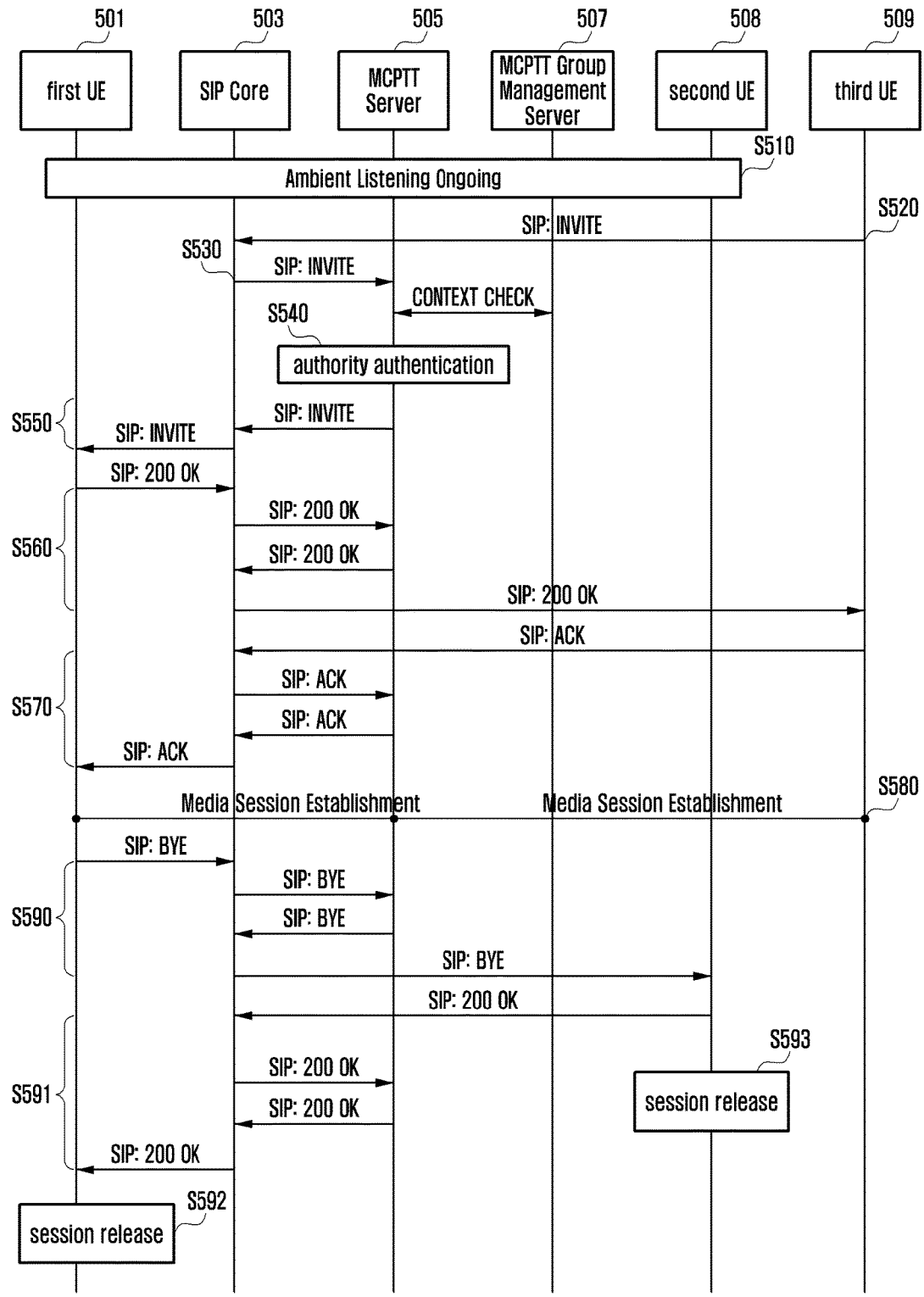
FIG. 5 is a signal flow diagram illustrating a procedure for a UE which is providing a unidirectional service to initiate a new unidirectional service upon receipt of a unidirectional service request from another UE according to an embodiment of the present disclosure.

FIG. 5 is a signal flow diagram illustrating a procedure for a UE which is providing a unidirectional service to initiate a new unidirectional service upon receipt of a unidirectional service request from another UE according to an embodiment of the present disclosure.

Referring to FIG. 5, the first UE 501 provides the second UE 508 with a unidirectional service (hereinafter, the ongoing unidirectional service is interchangeably referred to as first unidirectional service) at operation S510.

At this time, a third UE 509 may send at operation S520 the SIP core 503 an SIP INVITE message to request a unidirectional service (hereinafter, the unidirectional service requested by the third UE is interchangeably referred to as second unidirectional service).

If the SIP INVITE message is received, the SIP core 503 may forward the SIP INVITE message to the MCPTT server 505 at operation S530, and the MCPTT server 505 may perform a context check with an MCPTT group management server 507 and perform authority authentication on the third UE 509 at operation S540.

At this time, the MCPTT server 505 may determine whether the third UE 509 has the unidirectional service capability in the authority authentication procedure. The MCPTT server 505 may compare the priorities of the first and second unidirectional services in the authority authentication procedure. At this time, the MCPTT server 505 may know service-specific priorities.

As a comparison result, if the priority of the second unidirectional service is higher than that of the first unidirectional service, the MCPTT server 505 may perform successive operations to provide the second unidirectional service.

Otherwise, if the priority of the second unidirectional service is not higher than that of the first unidirectional service, the MCPTT server 505 may ignore the unidirectional service request from the third UE 509.

FIG. 5 is depicted under the assumption that the priority of the second unidirectional service is higher than that of the first unidirectional service. Accordingly, the MCPTT server 505 sends the first UE 501 the SIP INVITE message via the SIP core 503 at operation S550.

If the SIP INVITE message is received, the first UE 501 may send the third UE 509 an SIP 200 OK message via the SIP core 503 and the MCPTT server 505 at operation S560.

If the SIP 200 OK message is received, the third UE 509 may send the first UE 501 an SIP ACK message via the SIP core 503 and the MCPTT server 505 at operation S570.

Afterward, the first and third UEs 501 and 509 establish a session at operation S580.

Next, the first UE 501 may send the second UE 508 an end message (hereinafter, referred to as SIP BYE message) to release the first unidirectional service at operation S590.

If the SIP BYE message is received, the second UE 508 may send the first UE 501 the SIP 200 OK message via the SIP core 503 and the MCPTT server 505 at operation S591, and the first and second UEs 501 and 508 may release the previously established session at operations S592 and S593.

Meanwhile, the first unidirectional service may be released by the MCPTT server 505 as well as the first UE 501.

Figure 6:
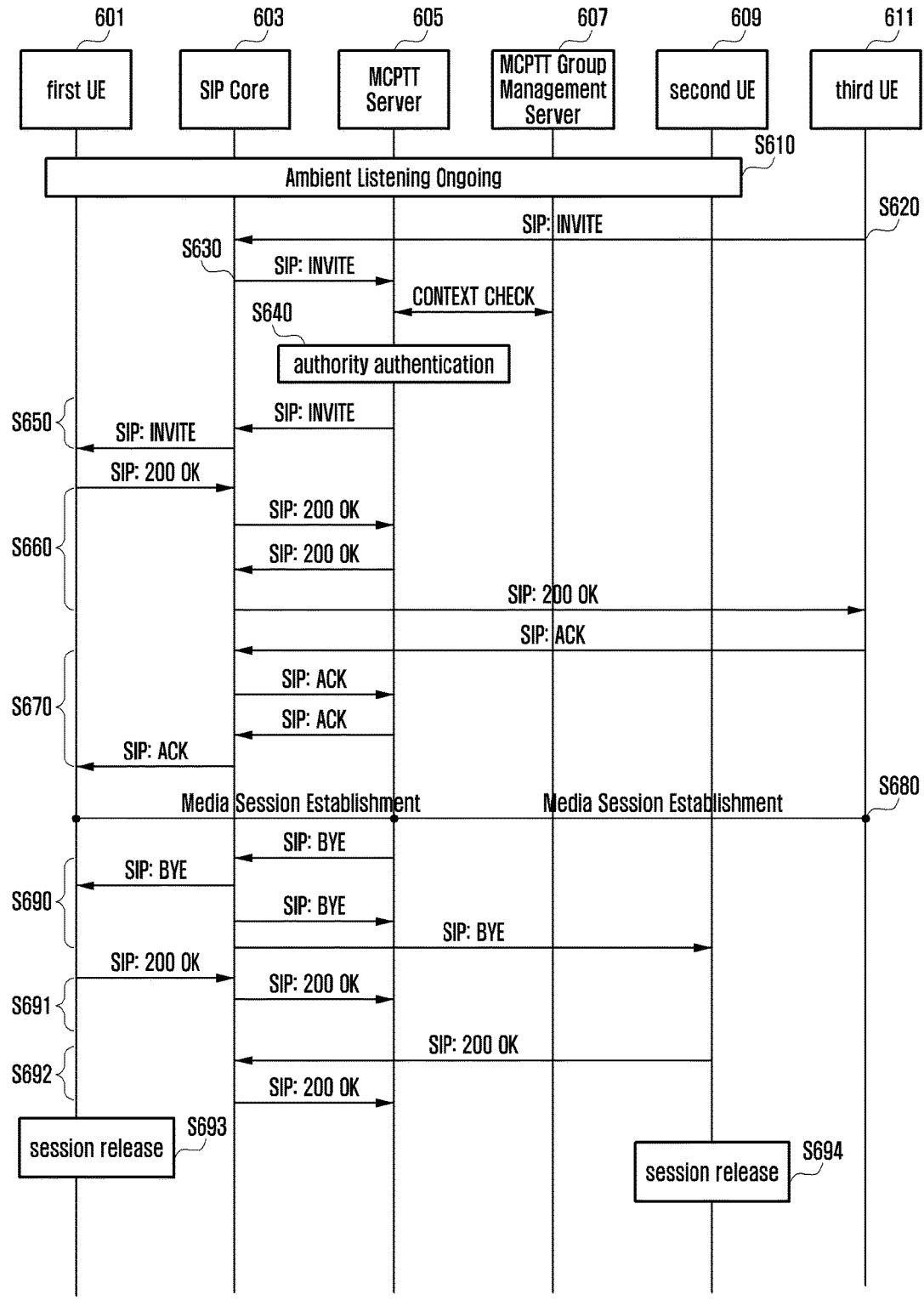
FIG. 6 is a signal flow diagram illustrating a procedure for an MCPTT server to release an ongoing unidirectional service according to an embodiment of the present disclosure.

FIG. 6 is a signal flow diagram illustrating a procedure for an MCPTT server to release an ongoing unidirectional service according to an embodiment of the present disclosure.

Referring to FIG. 6, the first UE 601 may receive a message requesting the second unidirectional service as a new unidirectional service from the third UE 611 during the first unidirectional service session at operation S610.

Since the second unidirectional service implementation process is identical with operations S520 to S580 of FIG. 5, a detailed description of operations S620 to S670 is omitted herein.

Once a session is established between the first and third UEs 601 and 611 at operation S680 through the above process, the first unidirectional service established between the first and second UEs 601 and 609 should be released.

For this purpose, the MCPTT server 605 may send the first and second UEs 601 and 609 an SIP BYE message to request release of the unidirectional service at operation S690.

In response to the SIP BYE message, the first UE 601 may send the MCPTT server 605 an SIP 200 OK message via the SIP core 603 at operation S691.

In response to the SIP BYE message, the second UE 609 may send the MCPTT server 605 an SIP 200 OK message via the SIP core 603 at operation 692.

If the SIP 200 OK message is received, the first and second UEs 601 and 609 may release the ongoing session at operations S693 and S694.

Although FIGS. 5 and 6 are directed to the case where the first UE receives a message requesting a new unidirectional service from a new UE and accepts the request, the first UE may reject the new unidirectional service request. A detailed description thereof is made with reference to FIG. 7.

Figure 7:
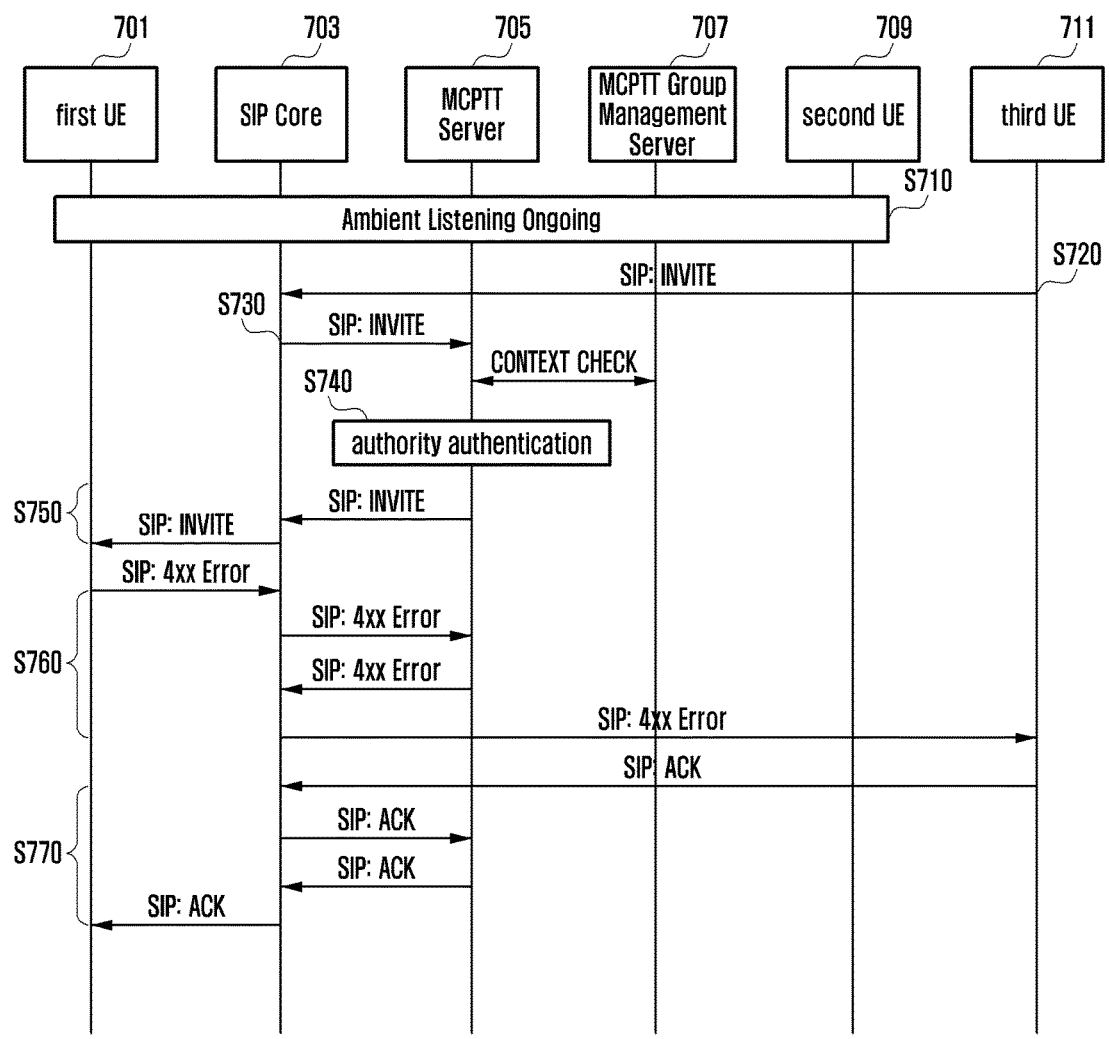
FIG. 7 is a signal flow diagram illustrating a procedure for rejecting a new unidirectional service request from a new UE according to an embodiment of the present disclosure.

FIG. 7 is a signal flow diagram illustrating a procedure for rejecting a new unidirectional service request from a new UE according to an embodiment of the present disclosure.

Referring to FIG. 7, the first UE 701 may be providing the second UE 709 with a unidirectional service (hereinafter, referred to as a first unidirectional service) at operation S710.

In order to request a new unidirectional service (hereinafter, referred to as a second unidirectional service), the third UE 711 may send the SIP core 703 an SIP INVITE message at operation S720.

If the SIP INVITE message is received, the SIP core 703 may forward the SIP INVITE message to the MCPTT server 705 at operation S730, and the MCPTT server 705 may perform a context check with MCPTT group management server 707 and perform authority authentication on the third UE 711 at operation S740.

That is, the MCPTT server 705 may perform the authority authentication to determine whether the third UE 711 has the unidirectional service capability and is subscribed to the unidirectional service.

The MCPTT server 705 may compare the priority of the first unidirectional service which is being provided currently and the priority of the second unidirectional service requested by the third UE 711 in the authority authentication process. At this time, the MCPTT server 705 may know the service-specific priorities.

As a comparison result, if it is determined that the priority of the second unidirectional service is higher than that of the first unidirectional service, the MCPTT server 705 may perform the successive operation to provide the second unidirectional service.

Otherwise, if it is determined that the priority of the second unidirectional service is not higher than that of the first unidirectional service, the MCPTT server 705 may ignore or reject the unidirectional service request from the third UE 711.

FIG. 7 is depicted under the assumption that the priority of the second unidirectional service is higher than that of the first unidirectional service. Accordingly, the MCPTT server 705 sends the first UE 701 the SIP INVITE message via the SIP core 703 at operation 750.

If the SIP INVITE message is received, the first UE 701 may determine whether to accept the second unidirectional service request. At this time, the first UE 701 may determine whether to accept the second unidirectional service request based on the priority of the second unidirectional service requested by the third UE 711, user preference, and current user status information.

If it is determined to reject the second unidirectional service, the first UE 701 may send the third UE 711 a reject message via the SIP core 703 and the MCPTT server 705 at operation S760.

At this time, the reject message may be an SIP message, e.g., SIP 4xx error message.

In response to the reject message, the third UE 711 may send the first UE 701 an ACK message via the SIP core 703 and the MCPTT server 705 at operation S770.

Figure 8:
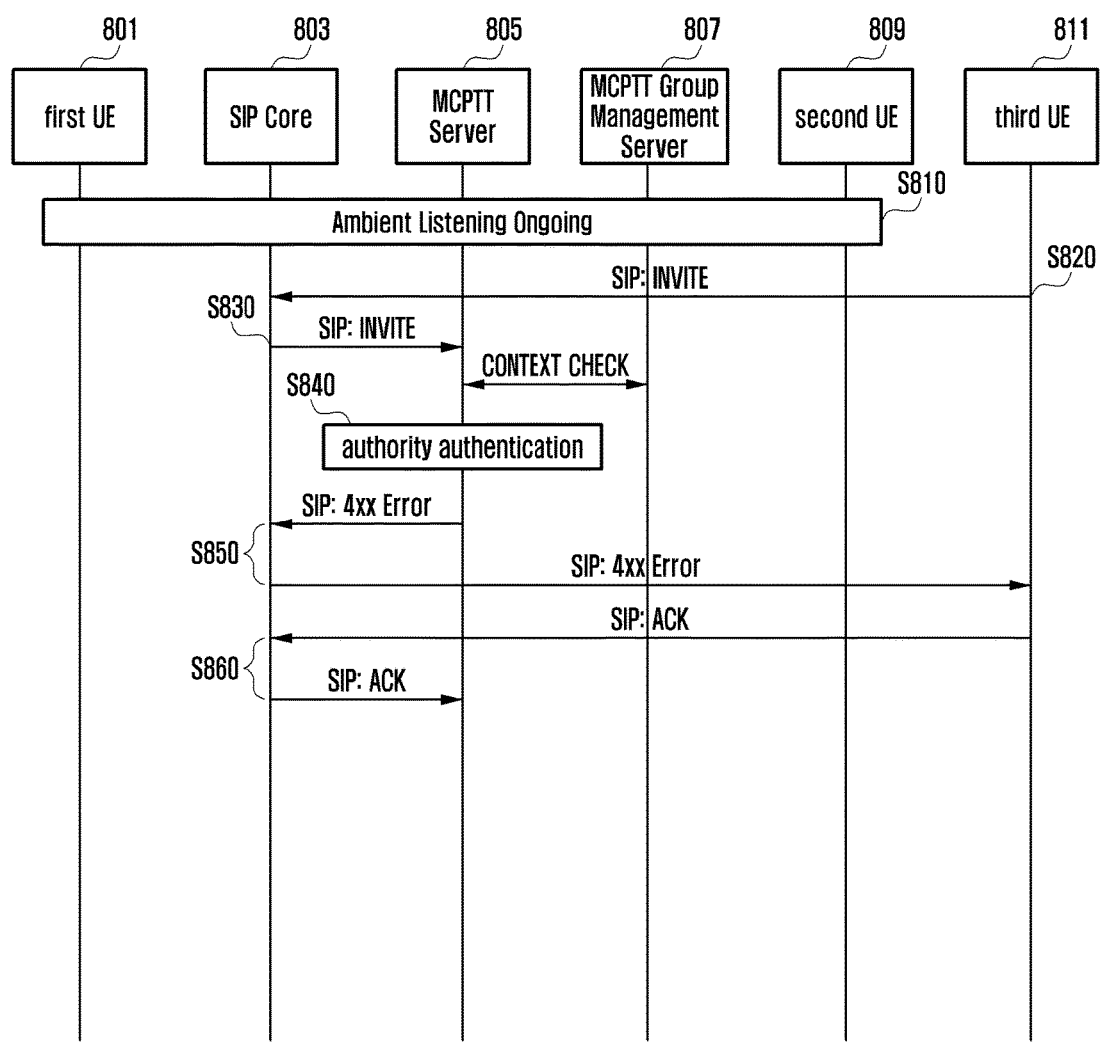
FIG. 8 is a signal flow diagram illustrating a procedure for an MCPTT server to reject a unidirectional service request from a UE according to an embodiment of the present disclosure.

The second unidirectional service request may be rejected by the MCPTT server 705 as well as the first UE 701, and a description thereof is made with reference to FIG. 8.

FIG. 8 is a signal flow diagram illustrating a procedure for an MCPTT server to reject a unidirectional service request from a UE according to an embodiment of the present disclosure.

Referring to FIG. 8, the first UE 801 may be providing the second UE 809 with the first unidirectional service at operation S810.

At this time, the third UE 811 may send the SIP core 803 an SIP INVITE message to request the second unidirectional service at operation S820.

The SIP core 803 may forward the SIP INVITE message to the MCPTT server 805 at operation S830, and the MCPTT server 805 may perform a context check with MCPTT group management server 807 and perform authority authentication on the third UE 811 at operation S840.

In the authority authentication process, the MCPTT server 805 may determine whether the third UE 811 has the unidirectional service capability. The MCPTT server 805 may determine whether to accept the second unidirectional service request based on the priority of the second unidirectional service requested by the third UE 811, user preference, and current user status information.

If it is determined to reject the second unidirectional service request because the priority of the second unidirectional service is lower than the priority of the first unidirectional service or in consideration of user preference and current user status, the MCPTT server 805 may send the third UE 811 a reject message for rejecting the second unidirectional service request via the SIP core 803 at operation S850.

In response to the reject message, the third UE 811 may send the MCPTT server 805 an ACK message via the SIP core 803 at operation S860.

The procedures of FIGS. 5 to 8 are directed to the cases where a UE receives a unidirectional service request from another UE during the ongoing unidirectional service session. It may also be possible for the UE to receive a request for a new service which is not the unidirectional service from another UE during the ongoing unidirectional service.

The operation of the UE which receives the new service request from another UE is described with reference to FIGS. 9A and 9B hereinafter.

Figure 9A:
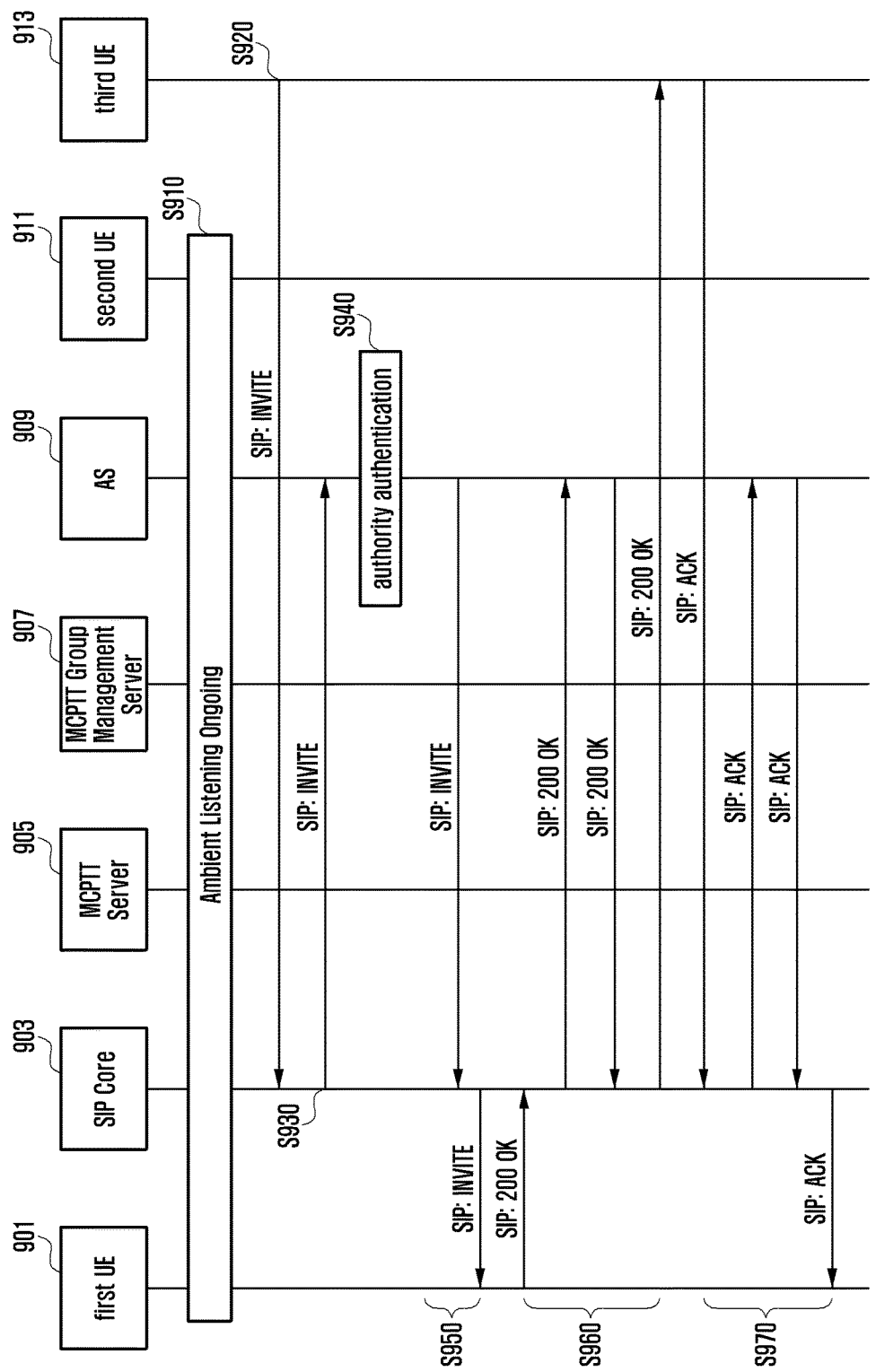

FIGS. 9A and 9B are a signal flow diagram illustrating a procedure of accepting a service request received during an ongoing unidirectional service according to various embodiments of the present disclosure.

Referring to FIG. 9A, the first UE 901 may be providing the second UE 911 with a unidirectional service at operation S910.

The third UE 913 may send the SIP core 903 an SIP INVITE message to request to the first UE 901 for a new service at operation S920.

Upon receipt of the SIP INVITE message, the SIP core 903 forwards the SIP INVITE message to the AS 909 at operation S930.

The SIP core 903 transmits the SIP INVITE message to the AS 909 rather than the MCPTT server 905 because the service requested by the third UE 913 is not a unidirectional service.

Upon receipt of the SIP INVITE message, the AS 909 may perform authority authentication on the third UE 913 at operation S940. At this time, the AS 909 may compare the priority of the ongoing unidirectional service and the priority of the new service requested by the third UE 913.

If it is determined that the priority of the new service is higher than the priority of the ongoing unidirectional service, the AS 909 may forward the SIP INVITE message to the first UE 901 via the SIP core 903 at operation S950.

In response to the SIP INVITE message, the first UE 901 may send the third UE 913 an SIP 200 OK message via the SIP core 903 and the AS 909 at operation S960.

If the SIP 200 OK message is received, the third UE 913 may send the first UE 901 an ACK message via the SIP core 903 and the AS server 909 at operation S970 and end the service commencement procedure.

As a consequence, the first and third UEs 901 and 913 establish a session at operation S980.

Afterward, the first UE 901 sends the second UE 911 a session end message (SIP BYE message) via the SIP core 903 and MCPTT server 905 to release the ongoing unidirectional service at operation S990.

In response to the SIP BYE message, the second UE 911 may send the first UE 901 an SIP 200 OK message via the SIP core 903 and the MCPTT server 905 at operation S991, and the first and second UEs 901 and 911 may release the old session at operations S992 and S993.

FIGS. 9A and 9B show a procedure of accepting a new service request from the third UE 913. The first UE 901 may also reject the new service request from the third UE 913 and a detailed description thereof is made with reference to FIG. 10.

Figure 10:
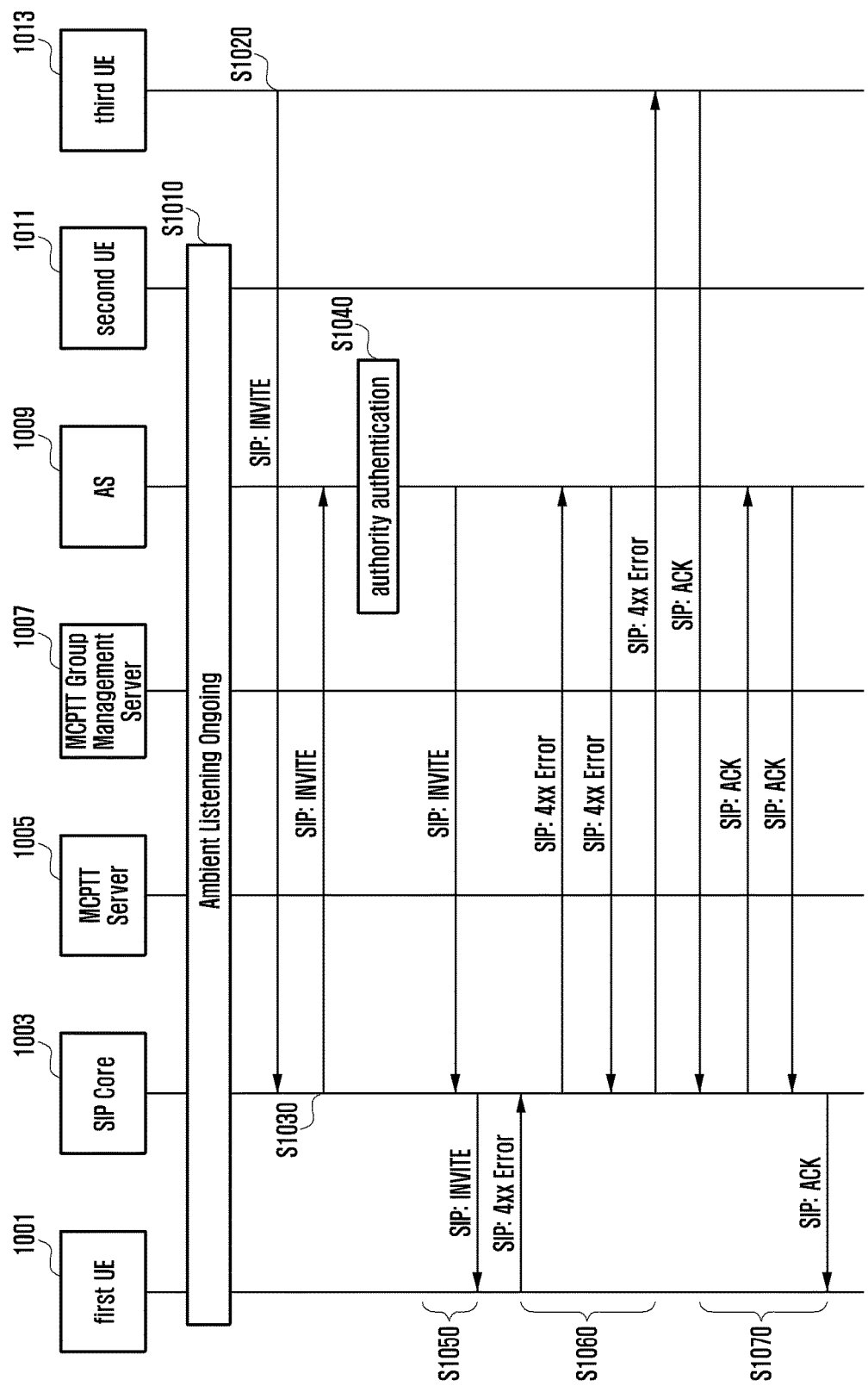
FIG. 10 is a procedure for rejecting a service request during an ongoing unidirectional service according to an embodiment of the present disclosure.

FIG. 10 is a procedure for rejecting a service request during an ongoing unidirectional service according to an embodiment of the present disclosure.

Referring to FIG. 10, the first UE 1001 may be providing the second UE 1011 with a unidirectional service at operation S1010.

The third UE 1013 may send the SIP core 1003 an SIP INVITE message to request to the first UE 1001 for a new service at operation S1020.

Upon receipt of the SIP INVITE message, the SIP core 1003 forwards the SIP INVITE message to the AS 1009 at operation S1030.

The SIP core 1003 transmits the SIP INVITE message to the MCPTT server 1005 because the service requested by the third UE 1013 is not a unidirectional service.

Upon receipt of the SIP INVITE message, the AS 1009 may perform authority authentication on the third UE 1013 at operation S1040. At this time, the AS 1009 may compare the priority of the ongoing unidirectional service and the priority of the new service requested by the third UE 1013.

If it is determined that the priority of the new service is higher than that of the ongoing unidirectional service, the AS 1009 may forward the SIP INVITE message to the first UE 1001 via the SIP core 1003 at operation S1050.

If the SIP INVITE message is received, the first UE 1001 may determine whether to accept the new service request made by the third UE 1013. At this time, the first UE 1001 may determine whether to accept the new service request based on the priority of the new service requested by the third UE 1013, user preference, and current user status information.

If it is determined to reject the new service request, the first UE 1001 may send the third UE 1013 a reject message via the SIP core 1003 and the AS 1009 at operation S1060. The reject message may be an SIP message, e.g. SIP 4xx error message.

Upon receipt of the reject message, the third UE 1013 may send the first UE 1001 the ACK message via the SIP core 1003 and the AS server 1009 at operation S1070.

Figure 11A:
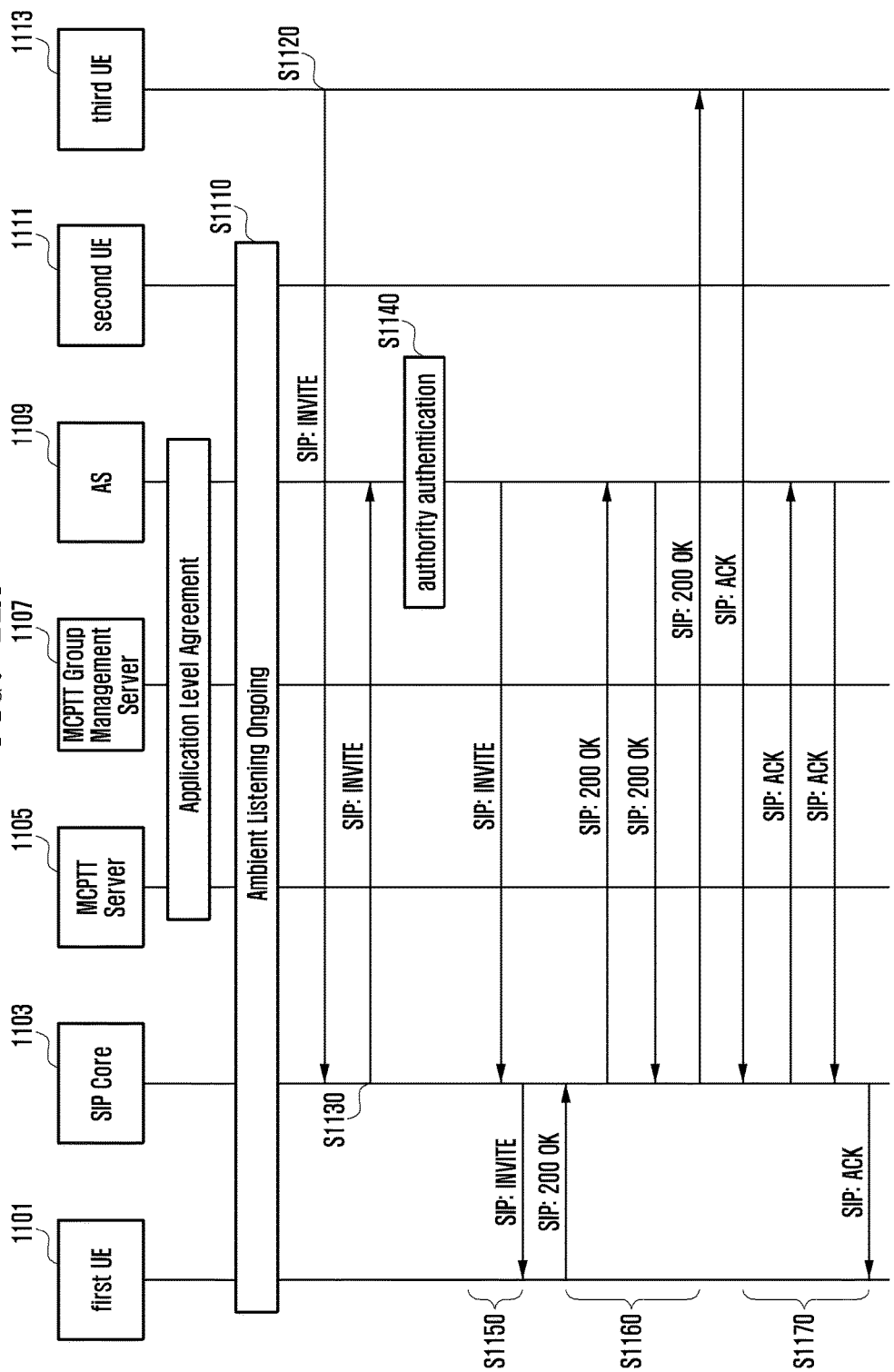
FIGS. 11A and 11B are directed to a method for an MCPTT server to release an ongoing unidirectional service when a session is established between a first and a third UE in addition to the ongoing unidirectional service by sharing the information on the UEs through an application level agreement between the MCPTT server and an application server (AS) according to various embodiments of the present disclosure.
Figure 11B:
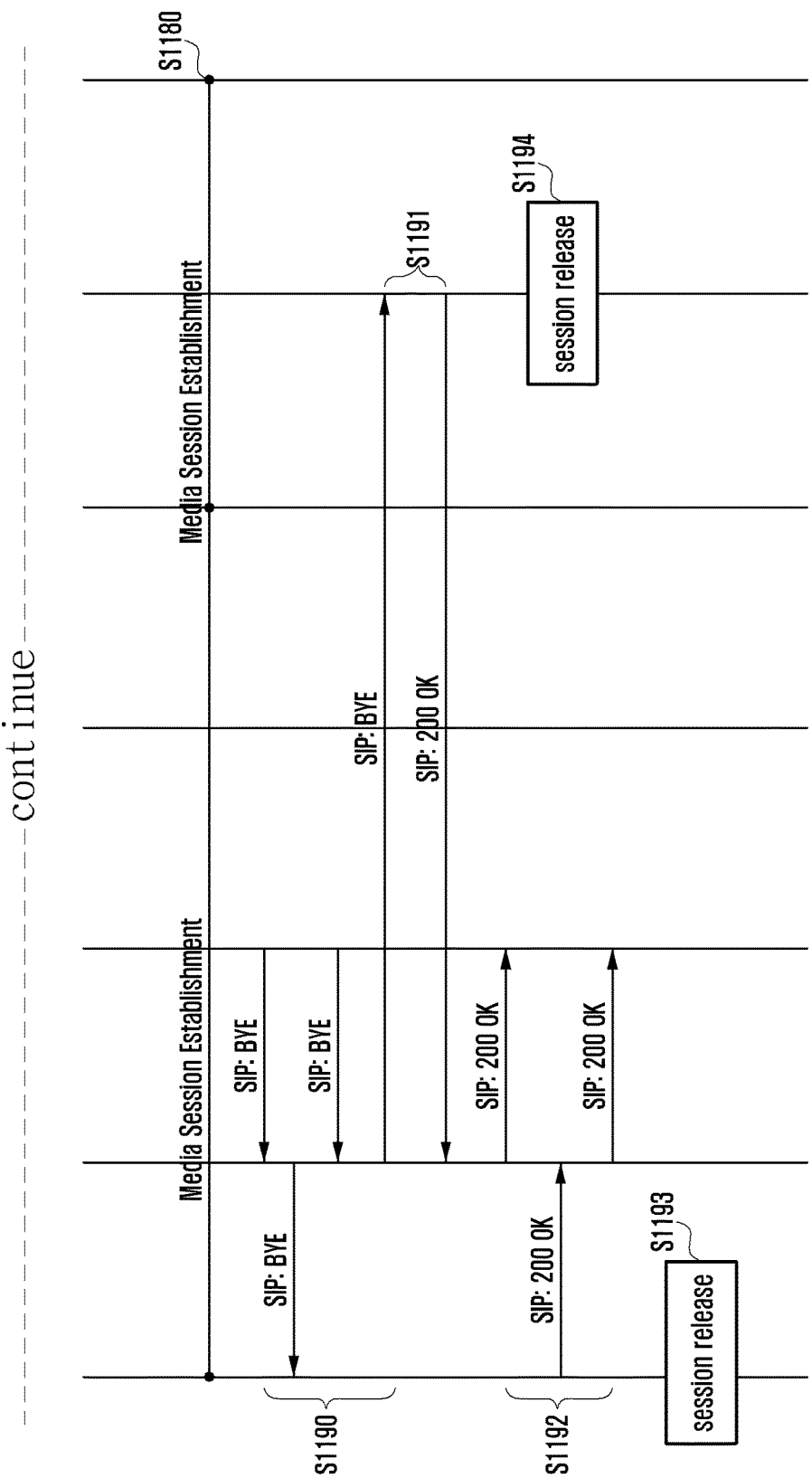

FIGS. 11A and 11B are a signal flow diagram illustrating a procedure for an MCPTT server to release an ongoing unidirectional service between two UEs upon receipt of a new service request made by another UE according to various embodiments of the present disclosure.

Since the MCPTT server is responsible for the unidirectional service and the AS is responsible for other types of services, if the third UE requests a new service during the unidirectional service between the first and second UEs, the MCPTT server cannot recognize the receipt of the new service request at the first UE. Since the MCPTT server cannot check the session established between the first and third UEs that is triggered by the new service request made by the third UE, it cannot know the necessity of releasing the ongoing unidirectional service. Accordingly, in order to release the ongoing unidirectional service, the first UE transmits the SIP BYE message.

FIGS. 11A and 11B are directed to a method for the MCPTT server to release the ongoing unidirectional service when a session is established between the first and third UEs in addition to the ongoing unidirectional service by sharing the information on the UEs through an application level agreement between the MCPTT server and AS according to various embodiments of the present disclosure.

Referring to FIGS. 11A and 11B, an application level agreement is made between the MCPTT server 1105 and the AS 1109.

The first UE 1101 may be providing the second UE 1111 with a unidirectional service at operation S1110.

The third UE 1113 may send the SIP core 1103 an SIP INVITE message to make a new request to the first UE 1101 at operation S1120.

The SIP core 1103 may forward the SIP INVITE message to the AS at operation S1130.

At this time, the SIP core 1103 forwards the SIP INVITE message to the AS 1109 rather than to the MCPTT server 1105 because the service requested by the third UE 1113 is not a universal service.

Upon receipt of the SIP INVITE message, the AS 1109 may perform authority authentication on the third UE 1113 at operation S1140. At this time, the AS 1109 may compare the priority of the ongoing unidirectional service established with the second UE 1111 and the priority of the new service requested by the third UE 1113.

If it is determined that the priority of the new service is higher than that of the ongoing unidirectional service, the AS 1109 may forward the SIP INVITE message to the first UE 1101 via the SIP core 1103 at operation S1150.

In response to the SIP INVITE message, the first UE 1101 may send the third UE 1113 an SIP 200 OK message via the SIP core 1103 and the AS 1109 at operation S1160.

Upon receipt of the SIP 200 OK message, the third UE 1113 may send the first UE 1101 an ACK message via the SIP core 1103 and the AS 1109 at operation S1170 to complete the service commencement procedure.

As a consequence, a session is established between the first and third UEs 1101 and 1113 at operation S1180.

Because the application level agreement is made between the MCPTT server 1105 and the AS 1109, the MCPTT server 1105 can be aware of the session established between the first and third UEs 1101 and 1113. Accordingly, the MCPTT server 1105 may transmit an SIP BYE message to the first and second UEs 1101 and 1111 via the SIP core 1103 to release the ongoing unidirectional service between the first and second UEs 1101 and 1111 at operation S1190.

In response to the SIP BYE message, the first UE 1101 may send the MCPTT server 1105 an SIP 200 OK message via the SIP core 1103 at operation S1191. Likewise, in response to the SIP BYE message, the second UE 1111 may send the MCPTT server 1105 an SIP 200 OK message at operation S1192.

Afterward, the first and second UEs 1101 and 1111 may release the session established therebetween at operations S1193 and S1194.

Figure 12A:
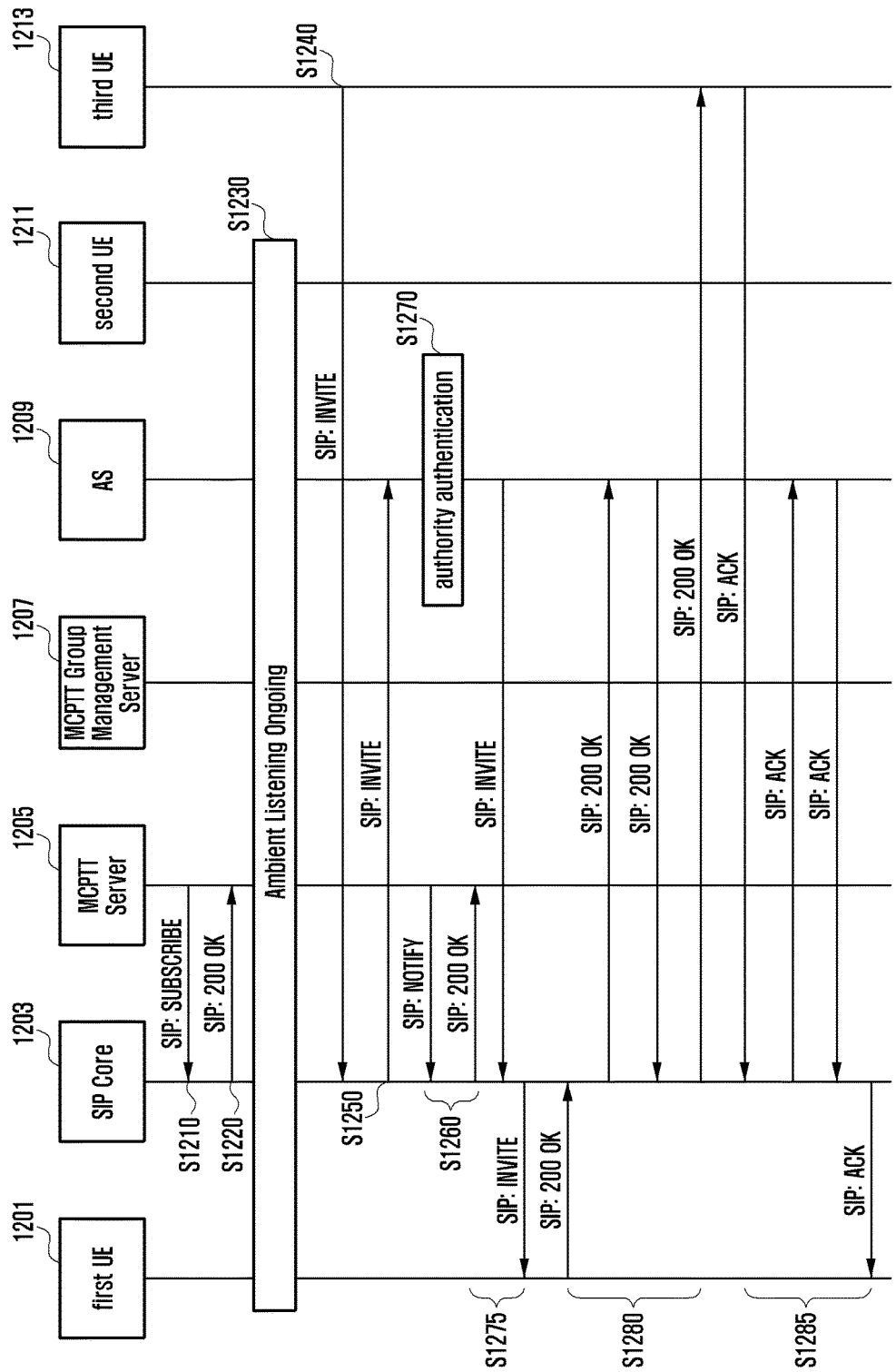
FIGS. 12A and 12B are a signal flow diagram illustrating a procedure for an MCPTT server to release an ongoing service established between a first and a second UE upon receipt of a new service request from a third UE according to various embodiments of the present disclosure.
Figure 12B:
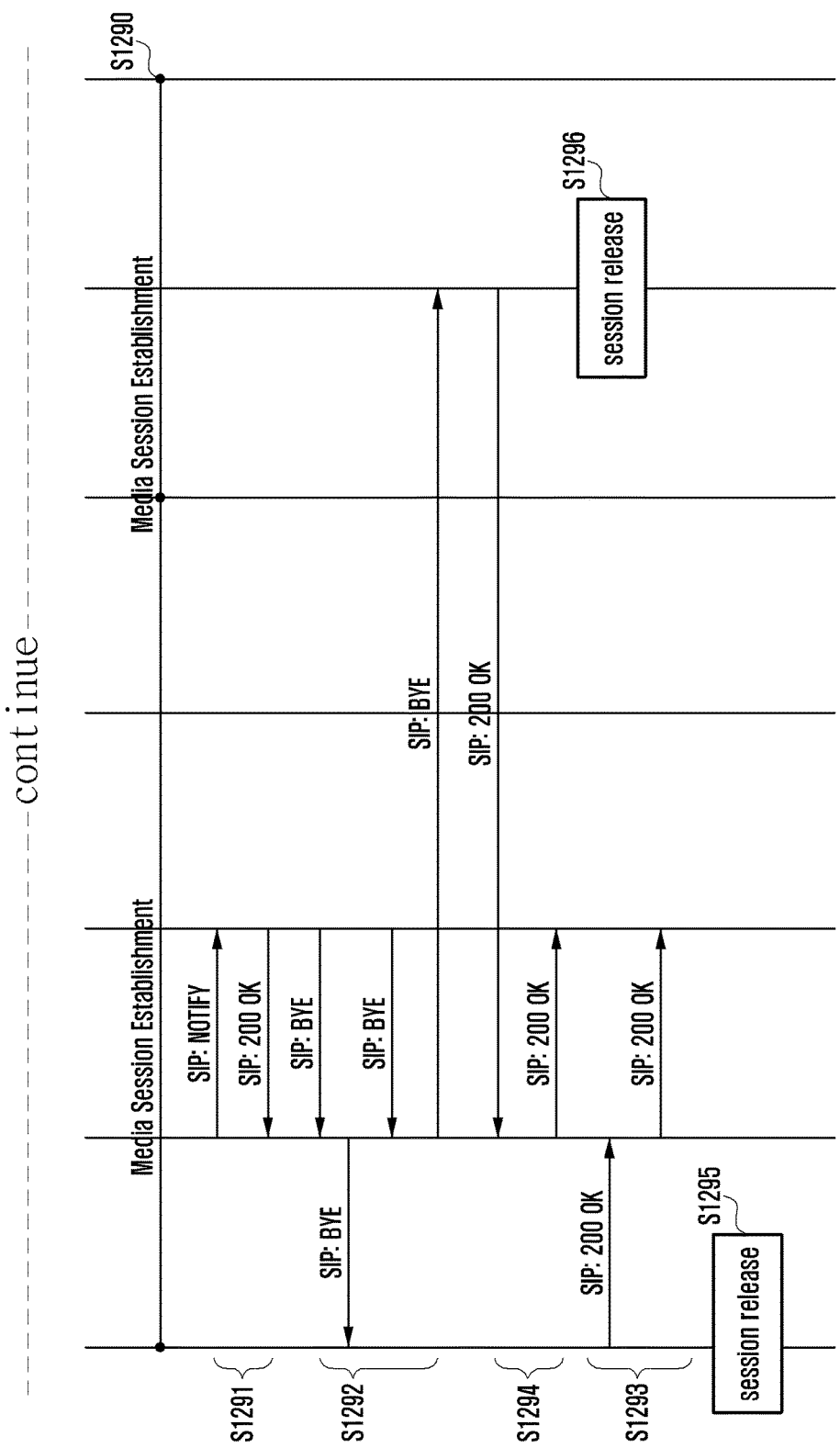

FIGS. 12A and 12B are a signal flow diagram illustrating a procedure for an MCPTT server to release an ongoing service established between a first and a second UE upon receipt of a new service request from a third UE according to various embodiments of the present disclosure.

Unlike the embodiment of FIGS. 11A and 11B in which the MCPTT server and the AS share the information on the first UE through an application level agreement, the MCPTT server makes an event subscription request to the SIP core to acquire the information on the first UE. A description is made of a method for releasing the ongoing unidirectional service established between the first and second UEs upon detecting a new service session established between the first and third UEs.

Referring to FIGS. 12A and 12B, the MCPTT server 1205 may send the SIP core 1203 an SIP SUBSCRIBE message at operation S1210 and receive an SIP 200 OK message in response to the SIP SUBSCRIBE message at operation S1220.

However, the SIP SUBSCRIBE message transmission is not limited to the timing as depicted in the drawing.

The first UE 1201 may be providing the second UE 1211 a unidirectional service at operation S1230.

The third UE 1213 may send the SIP core 1203 an SIP INVITE message to make a new service request to the first UE 1201 at operation S1240.

The SIP core 1203 forwards the SIP INVITE message to the AS 1209 at operation S1250.

The SIP core 1203 may send the MCPTT server 1205 an SIP NOTIFY message to notify that the third UE 1213 has made a new service request at operation S1260.

Upon receipt of the SIP INVITE message, the AS 1209 may perform authority authentication on the third UE 1213 at operation S1270. At this time, the AS 1209 may compare the priority of the ongoing unidirectional service and the priority of the new service requested by the third UE 1213.

If it is determined that the priority of the new service requested by the third UE 1213 is higher than that of the ongoing unidirectional service, the AS 1209 may forward the SIP INVITE message to the first UE 1201 via the SIP core 1203 at operation S1275.

In response to the SIP INVITE message, the first UE 1201 may send the third UE 1213 an SIP 200 OK message via the SIP core 1203 and the AS 1209 at operation S1280.

Upon receipt of the SIP 200 OK message, the third UE 1213 may send the first UE 1201 an SIP ACK message via the SIP core 1203 and the AS 1209 to complete the service commencement procedure at operation S1285.

As a consequence, a session is established between the first and third UEs 1201 and 1213 at operation S1290.

The SIP core 1203 may send the MCPTT server 1205 an SIP NOTIFY message to notify that a session has been established between the first and third UEs 1201 and 1213 at operation S1291.

The MCPTT server 1205 is aware of the session established between the first and third UEs 1201 and 1213 upon receipt of the SIP NOTIFY message. Then the MCPTT server 1205 may send the first and second UEs 1201 and 1211 an SIP BYE message via the SIP core 1203 to release the ongoing unidirectional service established between the first and second UEs 1201 and 1211 at operation S1292.

In response to the SIP BYE message, the first UE 1201 sends the MCPTT server 1205 an SIP 200 OK message via the SIP core 1203 at operation S1293. Likewise, in response to the SIP BYE message, the second UE 1211 sends the MCPTT server 1205 the SIP 200 OK message via the SIP core 1203 at operation S1294.

Then the first and second UEs 1201 and 1211 may release the session established therebetween at operations S1295 and S1296.

Unlike the embodiments of FIGS. 11A and 11B and FIGS. 12A and 12B, the UE may receive a unidirectional service request during an ongoing non-unidirectional service. Even in this case, the UE may determine whether to accept the unidirectional service request based on the priorities of the requested unidirectional service and the ongoing service, user preference, and current user status.

Whether to accept the unidirectional service request may be determined by the MCPTT server. The MCPTT server is capable of being aware that the UE which has received the unidirectional service request is receiving another service through the application level agreement with the AS or event subscription to the SIP core. Accordingly, the MCPTT server may determine whether to accept the unidirectional service request based on the priorities of the requested unidirectional service and the ongoing service, user preference, and current user status.

Figure 13:
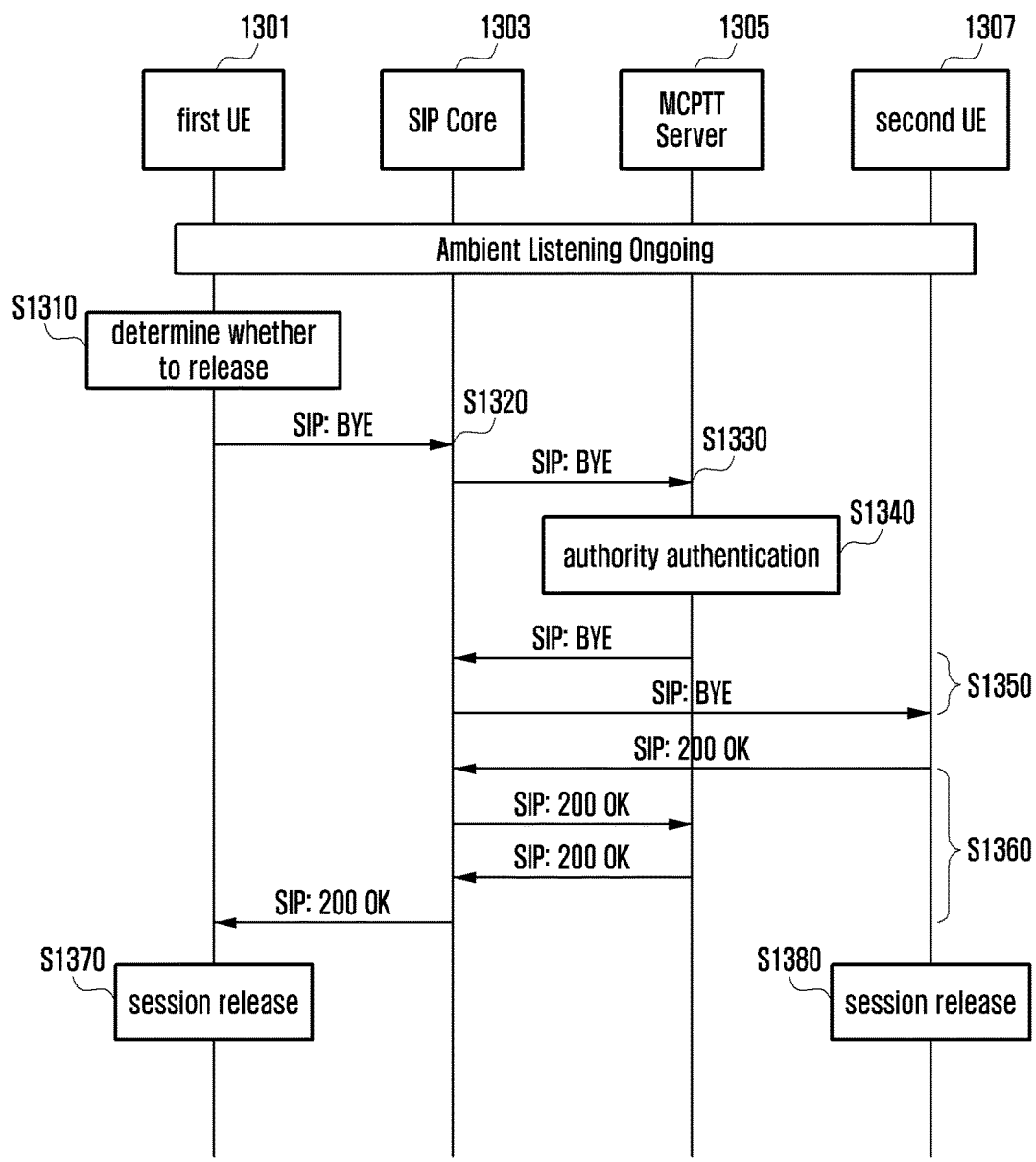
FIG. 13 is a signal flow diagram illustrating a procedure for a UE to release an ongoing unidirectional service according to an embodiment of the present disclosure.

FIG. 13 is a signal flow diagram illustrating a procedure for a UE to release an ongoing unidirectional service according to an embodiment of the present disclosure.

Referring to FIG. 13, the first UE 1301 in a unidirectional service session may determine whether to release the unidirectional service at operation S1310. For example, the first UE 1301 may determine to release the unidirectional service when the emergency situation is resolved or a higher priority service is requested.

If it is determined to release the unidirectional service, the UE 1301 may send the SIP core 1303 an SIP BYE message to release the unidirectional service at operation S1320. The SIP core 1303 may forward the SIP BYE message to the MCPTT server 1305 at operation S1330.

Upon receipt of the SIP BYE message, the MCPTT server 1305 may perform authority authentication to determine whether the first UE 1301 has a right to release the unidirectional service at operation S1340.

The unidirectional service release procedure is performed differently depending on the entity which has initiated the unidirectional service. If the unidirectional service is initiated by a UE, the unidirectional service may be released by the UE, the service manager, or the MCPTT server.

If the unidirectional service is initiated by the service manager, the UE cannot release the corresponding unidirectional service. This means that only the service manager and MCPTT server can release the corresponding service. If the UE tries to release the unidirectional service initiated by the service manager, a release request is transmitted to the MCPTT server via the SIP core and, at this time, the MCPTT server checks that the UE has no right to release the unidirectional service and thus rejects the release request.

If a unidirectional service release request is received from the UE or the service manager, the MCPTT server determines whether the entity which has requested the unidirectional service release has the right to release the unidirectional service.

In the drawing, it is assumed that the first UE 1301 has the right to release the unidirectional service. Accordingly, the MCPTT server 1305 checks the service release right of the first UE 1301 and sends the second UE 1307 an SIP BYE message via the SIP core 1301 at operation S1350.

In response to the SIP BYE message, the second UE 1307 sends the first UE 1301 an SIP 200 OK message via the SIP core 1303 and the MCPTT server 1305 at operation S1360, and the first and second UEs 1301 and 1307 release the unidirectional service session at operations S1370 and S1380.

Figure 14:
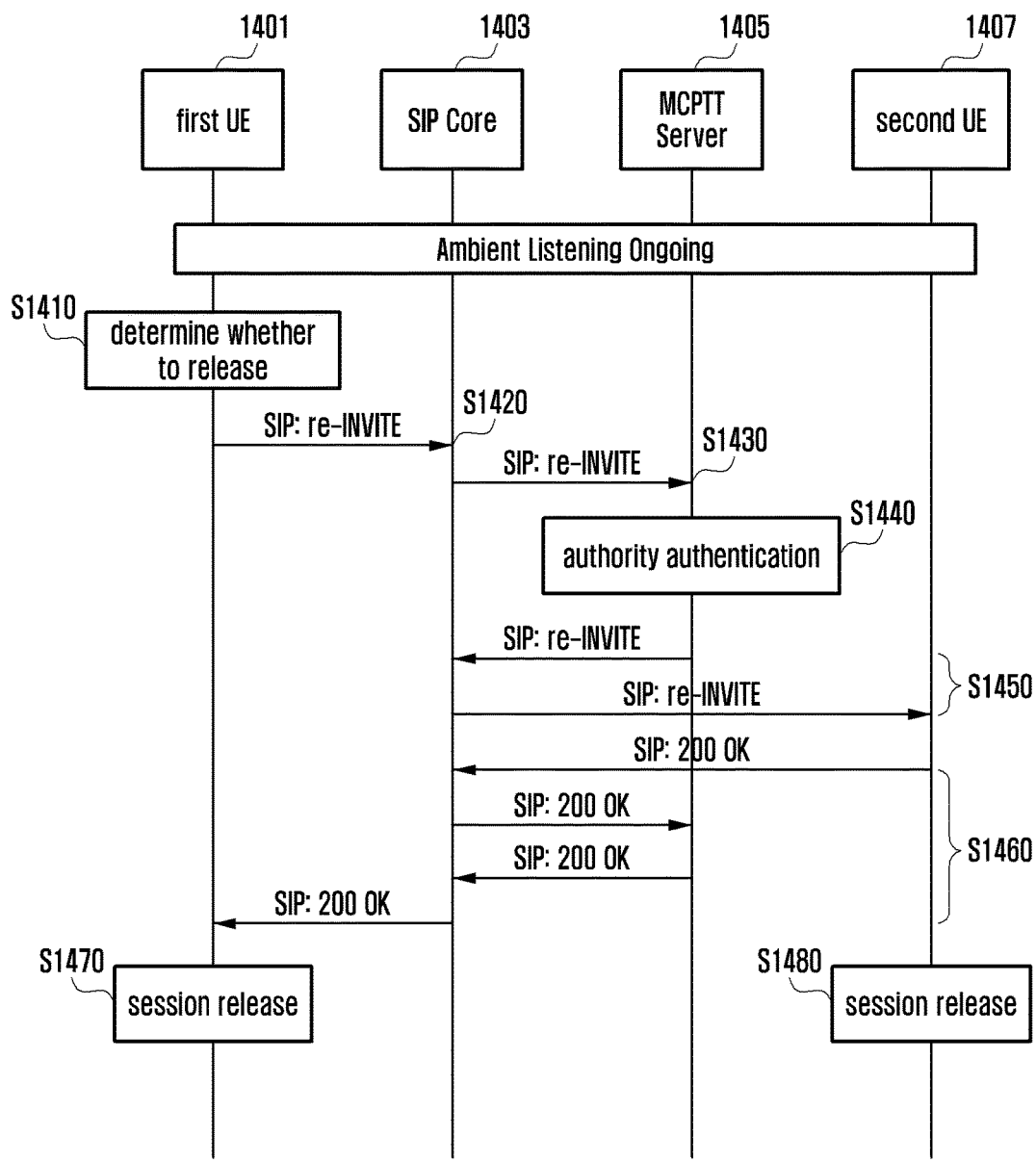
FIG. 14 is a signal flow diagram illustrating a procedure for a UE to release a unidirectional service using an SIP re-INVITE message instead of an SIP BYE message according to an embodiment of the present disclosure.

FIG. 14 is a signal flow diagram illustrating a procedure for a UE to release a unidirectional service using an SIP re-INVITE message instead of the SIP BYE message according to an embodiment of the present disclosure.

Referring to FIG. 14, as described with reference to FIG. 13, the first UE 1401 in a unidirectional service session may determine whether to release the unidirectional service at operation S1410.

If it is determined to release the unidirectional service, the UE 1401 may send the SIP core 1303 an SIP re-INVITE message instead of the SIP BYE message to release the unidirectional service at operation S1420.

The first UE 1401 may block transmitting data in the current session rather than releasing the session by transmitting the SIP re-INVITE message. At this time, the first UE 1401 may set an SDP of the SIP re-INVITE message to a=inactive or a=rcvonly. That is, the first UE 1401 may set the SDP to a value indicating session deactivation or reception only to block the unidirectional service.

The SIP core 1403 may forward the SIP re-INVITE message to the MCPTT server 1405 at operation S1430.

Upon receipt of the SIP re-INVITE message, the MCPTT server 1405 performs authority authentication to determine whether the first UE has the right to release the unidirectional service at operation S1440.

If it is determined that the first UE 1401 has the right to release the unidirectional service, the MCPTT server 1405 sends the second UE 1407 an SIP re-INVITE message via the SIP core 1403 at operation S1450.

In response to the SIP re-INVITE message, the second UE 1407 may send the first UE 1401 an SIP 200 OK message via the SIP core 1403 and the MCPTT server 1405 at operation 1460, and the first and second UEs 1401 and 1407 may block data transmission without releasing the session at operations S1470 and S1480.

Unlike the embodiments of FIGS. 13 and 14, the unidirectional service may be released by a service manager, and a description thereof is made hereinafter.

Figure 15:
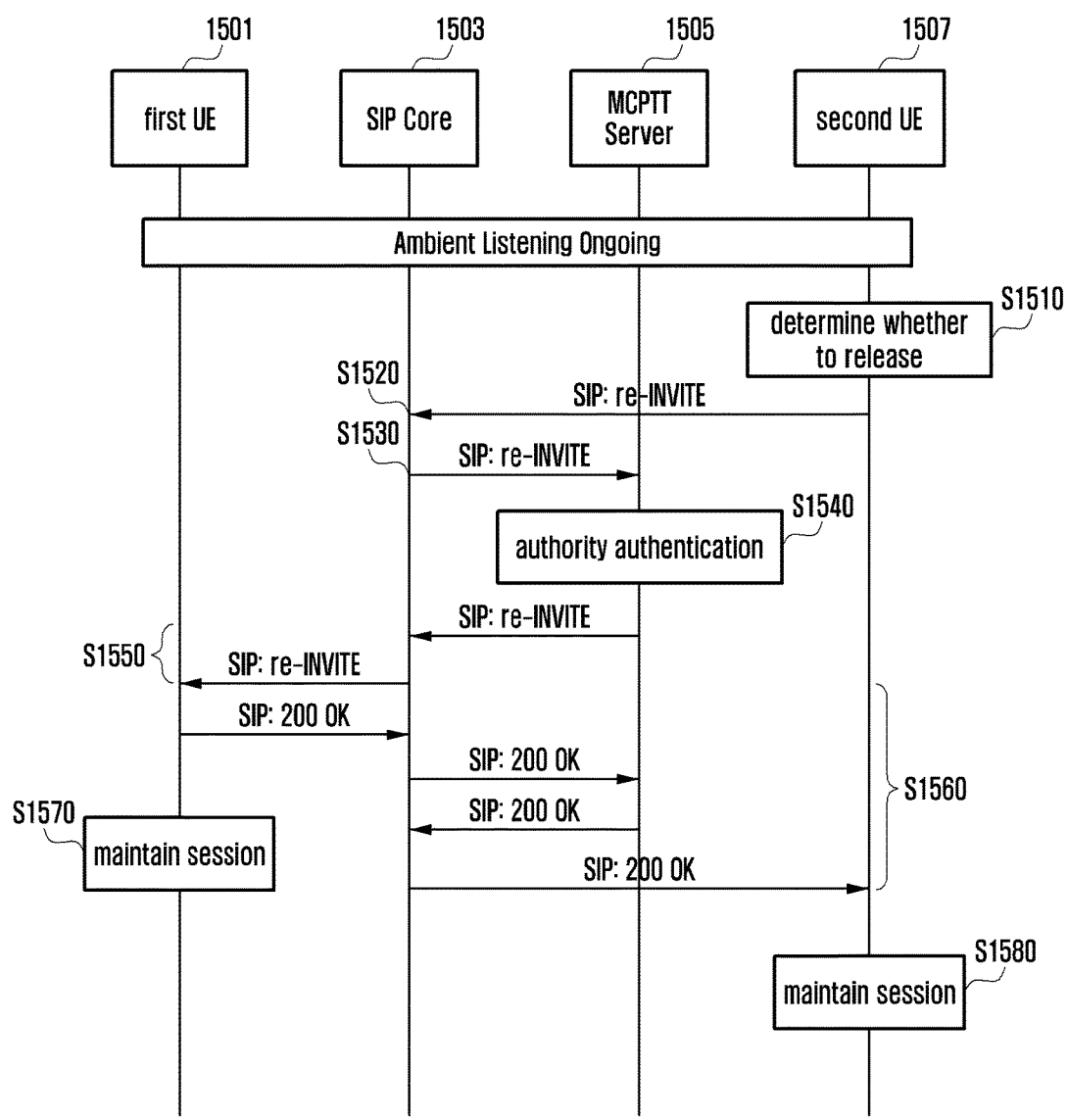
FIG. 15 is a signal flow diagram illustrating a procedure for a second UE to release a unidirectional service according to an embodiment of the present disclosure.

FIG. 15 is a signal flow diagram illustrating a procedure for a second UE to release a unidirectional service according to an embodiment of the present disclosure. In FIG. 15, the second UE 1507 may include a service manager.

Referring to FIG. 15, the second UE 1507 in a unidirectional service session may determine whether to release the unidirectional service at operation 51510.

If it is determined to release the unidirectional service, the second UE 1507 may send the SIP core 1503 an SIP re-INVITE message to release the unidirectional service at operation S1520. At this time, the second UE 1507 may set the SDP of the SIP re-INVITE message to a=inactive or a=rcvonly. That is, the second UE 1507 may deactivate the session or allow for reception only to suspend the unidirectional service.

The second UE 1507 may send an SIP BYE message instead of the SIP re-INVITE message.

The SIP core 1503 may forward the SIP re-INVITE message to the MCPTT server 1505 at operation S1530.

Upon receipt of the SIP re-INVITE message, the MCPTT server 1505 performs authority authentication to determine whether the second UE 1507 has the right to release the unidirectional service at operation S1540.

If it is determined that the second UE 1507 has the right to release the unidirectional service, the MCPTT server 1505 forwards the SIP re-INVITE message to the first UE 1501 via the SIP core 1503 at operation S1550.

In response to the SIP re-INVITE message, the first UE 1501 may send the second UE 1507 an SIP 200 OK message via the SIP core 1503 and the MCPTT server 1505 at operation S1560, and the first and second UEs 1501 and 1507 may suspend data transmission without releasing the session at operation S1570 and S1580.

Figure 16:
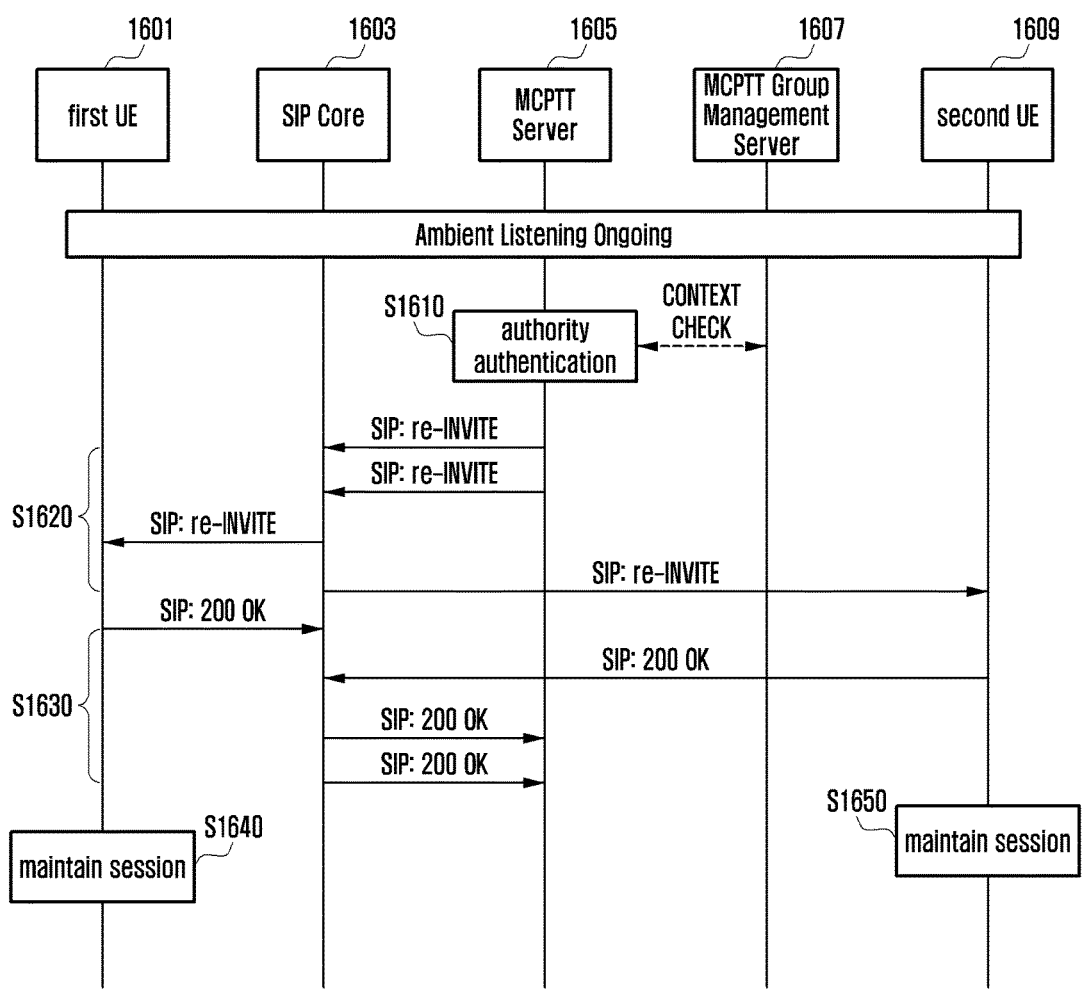
FIG. 16 is a signal flow diagram illustrating a procedure for an MCPTT server to release a unidirectional service according to an embodiment of the present disclosure.

FIG. 16 is a signal flow diagram illustrating a procedure for an MCPTT server to release the unidirectional service according to an embodiment of the present disclosure.

Referring to FIG. 16, the MCPTT server 1605 may release the unidirectional service. The MCPTT server 1605 may determine whether to release the unidirectional service and, if it is determined to release the unidirectional service, perform authority authentication at operation S1610.

If the authority authentication is completed, the MCPTT server 1605 may send the first and second UEs 1601 and 1609 an SIP re-INVITE message via the SIP core 1603 to release the unidirectional service at operation S1620. At this time, the MCPTT server 1605 may set the SDP of the SIP re-INVITE message to a=inactive or a=rcvonly. That is, the MCPTT server 1605 may deactivate the session or allow for reception only using the SDP. The MCPTT server 1605 may include a cause of the unidirectional service release in the SIP header.

The first UE 1601 may transmit the SIP BYE message instead of the SIP re-INVITE message.

In response to the SIP re-INVITE message, the first and second UEs 1601 and 1609 may send the MCPTT server 1605 an SIP 200 OK message via the SIP core 1603 at operation S1630.

The first and second UEs 1601 and 1609 may suspend data transmission without releasing the session at operations S1640 and S1650.

The MCPTT server may release the session using the SIP BYE message instead of the SIP re-INVITE message.

Figure 17:
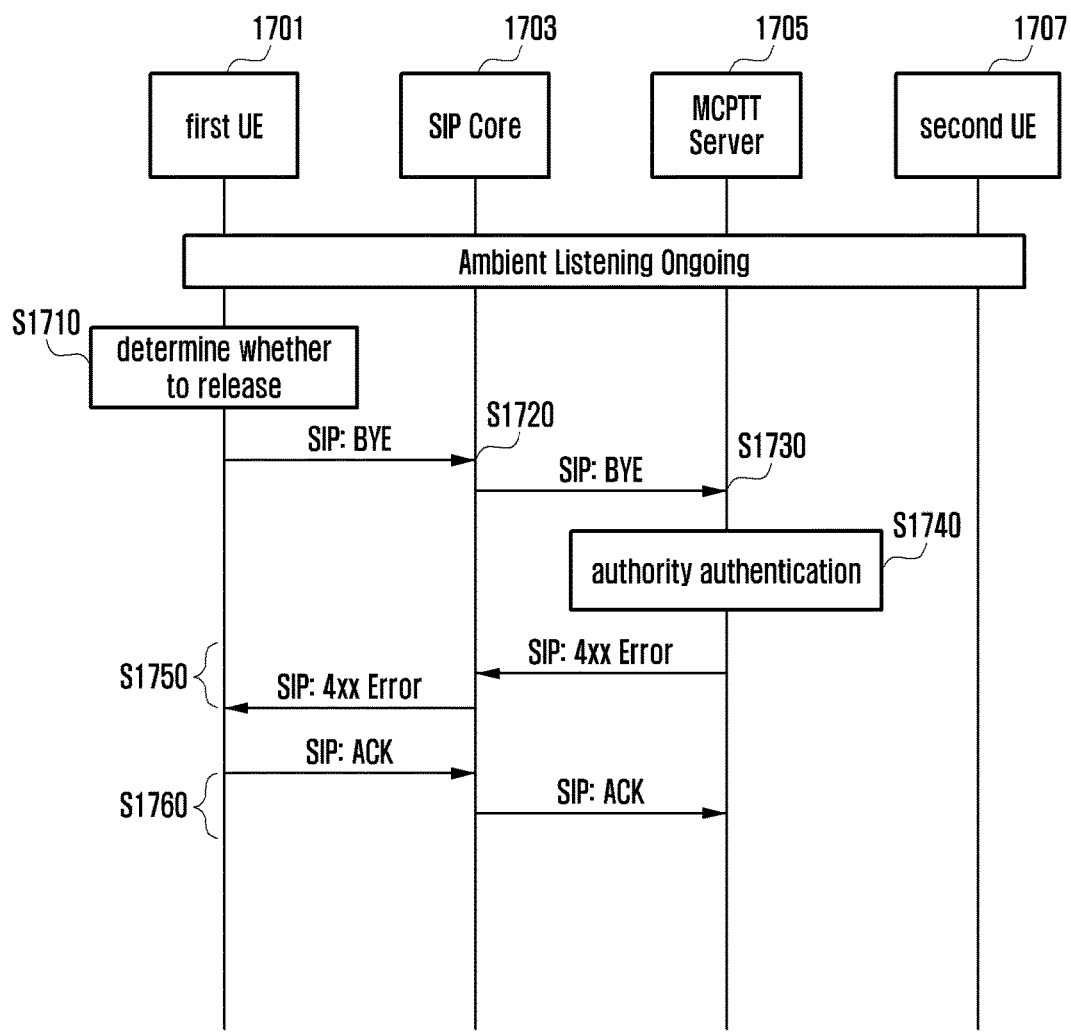
FIG. 17 is a signal flow diagram illustrating a procedure for rejecting a unidirectional service release request made by a UE having no right to release the unidirectional service according to an embodiment of the present disclosure.

FIG. 17 is a signal flow diagram illustrating a procedure for rejecting a unidirectional service release request made by a UE having no right to release the unidirectional service according to an embodiment of the present disclosure.

Referring to FIG. 17, the first UE 1701 in a unidirectional service session may determine to release the unidirectional service at operation S1710.

If it is determined to release the unidirectional service, the first UE 1701 may send the SIP core 1703 an SIP BYE message to release the unidirectional service at operation S1720. The UE 1701 may transmit an SIP re-INVITE message.

The SIP core 1303 forwards the SIP BYE message to the MCPTT server 1705 at operation S1730.

Upon receipt of the SIP BYE message, the MCPTT server 1705 performs authority authentication to determine whether the first UE which has made the unidirectional service release request has the right to release the unidirectional service at operation S1740.

As described above, the unidirectional service release procedure is performed differently depending on the entity which has initiated the unidirectional service. If the unidirectional service is initiated by a service manager, the UE cannot release the corresponding unidirectional service. This means that only the service manager and MCPTT server can release the corresponding service. If the UE tries to release the unidirectional service initiated by the service manager, a release request is transmitted to the MCPTT server via the SIP core and, at this time, the MCPTT server checks that the UE has no right to release the unidirectional service and thus rejects the release request.

In the drawing, it is assumed that the first UE 1701 has no right to release the unidirectional service. Accordingly, the MCPTT server 1705 fails the authority authentication at operation S1740 because the first UE 1701 has no right to release the unidirectional service. If the authority authentication fails, the MCPTT server 1705 may send the first UE 1701 a reject message via the SIP core 1703 at operation S1750. The reject message may be an SIP 4xx error message.

If the reject message is received, the first UE 1701 may send the MCPTT server 1705 an SIP ACK message indicating the receipt of the rejection message via the SIP core 1703 at operation S1760.

In the case that the first UE 1701 has no right to release the unidirectional service, it may control such that a unidirectional service release button is not presented on its UI. As a consequence, the user cannot make a unidirectional service release request by means of the first UE.

In the case that the first UE 1701 has no right to release the unidirectional service, it is necessary to avoid a power-off state of the first UE 1701 to prevent the unidirectional service from being released unintentionally. Accordingly, the first UE 1701 may be configured to display a screen showing as if the UE is in a power-off state, even if this is not the actual case, when the power button is pushed.

Even in the case where the UI of the first UE 1701 displays a service release button, the MCPTT server 1705 may determine whether the first UE 1701 has the right to release the unidirectional service and, if not, reject the unidirectional service release request of the UE.

Figure 18:
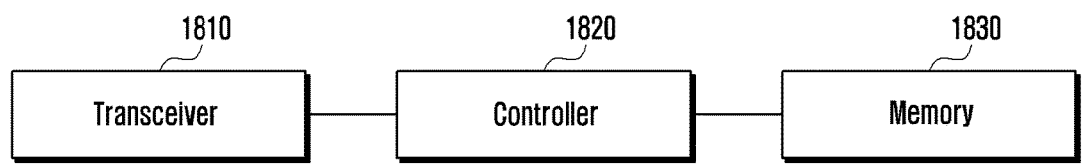
FIG. 18 is a block diagram illustrating a configuration of a UE according to an embodiment of the present disclosure.

FIG. 18 is a block diagram illustrating a configuration of a UE according to an embodiment of the present disclosure.

Referring to FIG. 18, the UE may include a transceiver 1810, a controller (processor) 1820, and a memory 1830.

The transceiver 1810 is responsible for communication with other network entities. The transceiver 1810 may communicate messages with other network entities for a unidirectional service.

The controller 1820 may transmit a registration message to register the UE with an MCPTT server. The controller 1820 may control the transceiver 1810 to transmit an SIP INVITE message to request the unidirectional service. At this time, the controller 1820 may generate the SIP INVITE message including the information on the unidirectional information.

The controller 1820 may also set a service mode parameter to a value indicating a manual service commencement for starting the service according to a user input or an automatic service commencement for starting the service immediately without any user input.

The controller 1820 may transmit a message for releasing the ongoing unidirectional service or a non-unidirectional service (normal service).

The controller 1820 may also receive a response message in reply to the release message. The controller 1820 may also transmit a response message in replay to a received message.

The controller 1820 may establish a session with the UE which has requested the corresponding service.

If a session is established with a new UE, the controller 1820 may release the ongoing service established with another UE. If the UE has no right to release the unidirectional service, the controller 1820 may control the UI to hide a unidirectional service release button. Then the user cannot make a unidirectional service release request.

If the UE has no right to release the unidirectional service, the controller 1820 may control the UE to display a screen showing as if the UE is in a power-off state, even if this is not the actual case, when the power button is pushed.

The memory 1830 may store the information for use in determining whether to accept a service request. The memory 1830 may store service-specific priorities and user preference information.

Figure 19:
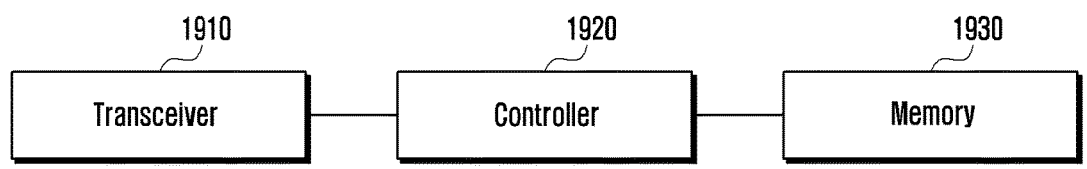
FIG. 19 is a block diagram illustrating a configuration of a server according to an embodiment of the present disclosure.

FIG. 19 is a block diagram illustrating a configuration of a server according to an embodiment of the present disclosure.

Referring to FIG. 19, the server according to an embodiment of the present disclosure includes a transceiver 1910, a controller (processor) 1920, and a memory 1930.

The transceiver 1920 is responsible for communication with other network entities. In more detail, the transceiver 1910 may make it possible for the server to communicate with a UE, a service manager, an SIP core, and a group management server.

The controller 1920 may perform authority authentication on the UE which requests a service. That is, the controller 1920 may determine whether the UE has a unidirectional service capability and is subscribed to the MCPTT service. In the case that the message transmitted by the UE includes a service commencement mode value, the controller 1920 may determine whether the UE has a right to configure the service commencement mode. If the UE makes a request for releasing the service, the controller 1920 may determine whether the UE has a right to release the service. If the authority authentication fails, the controller 1920 may transmit a reject message.

If a new service request is received, the controller 1920 may compare the priority of the ongoing service and the priority of the newly requested service to determine whether to forward the new service request to the UE.

If it is determined to provide the new UE with the unidirectional service or the normal service, the controller 1920 may control to release the ongoing service.

The controller 1920 may recognize whether the requested service is a normal service and whether the request is accepted based on the application level agreement and subscribe message exchange with the SIP core.

If it is determined to release the service, the controller 1920 may transmit a message for releasing the service.

The memory 1930 may store the information for use in performing the authority authentication. That is, the memory 1903 may store the information on the UEs having the unidirectional service capability and/or the service commencement mode configuration capability.

The memory 1930 may also store service-specific priority information, user preference information, and current user status information for use in determining whether to accept a request for a new service.

As described above, the service implementation method and apparatus of the present disclosure is advantageous in terms of acquiring media content on surroundings of the terminal in an emergency situation and transmitting the media content to an emergency situation manager efficiently.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first terminal in a communication system, the method comprising:
   registering with a server by transmitting a registration message to the server;
   identifying that a first unidirectional service is triggered, the first unidirectional service being triggered based on at least one sensor of the first terminal;
   transmitting a first service request message including information requesting the first unidirectional service to the server, the first service request message including a service commencement mode indicating whether the first unidirectional service is to be started automatically or manually;
   establishing a first session for the first unidirectional service with a second terminal without response of the second terminal if the service commencement mode indicates that the first unidirectional service is to be started automatically, the first session being used only for the first terminal to transmit ambient media of the data first terminal; and
   transmitting the ambient media through the first session for the first unidirectional service to the second terminal.

2. The method of claim 1,
   wherein the first unidirectional service comprises a service transmitting the ambient media in a unidirectional manner.

3. The method of claim 1, further comprising:
   receiving a second service request message for requesting a second unidirectional service; and
   determining whether to accept the second service request message based on at least one of service priority information or user information.

4. The method of claim 3, further comprising:
   transmitting, when the second service request message is accepted, a release message for releasing the first session;
   establishing a second session with another terminal requesting the second unidirectional service; and
   transmitting, when the second service request message is not accepted, a reject message for rejecting the second service request message.

5. A first terminal in a communication service, the terminal comprising:
   a transceiver; and
   a controller coupled with the transceiver and configured to:
     register with a server by transmitting a registration message to the server,
     identify that a first unidirectional service is triggered, the first unidirectional service being triggered based on at least one sensor of the first terminal,
     transmit a first service request message including information requesting the first unidirectional service to the server, the first service request message including a service commencement mode indicating whether the first unidirectional service is to be started automatically or manually,
     establish a first session for the first unidirectional service with a second terminal without response of the second terminal if the service commencement mode indicates that the first unidirectional service is to be started automatically, the first session being used only for the first terminal to transmit ambient media of the first terminal, and
     transmit the ambient media through the first session for the first unidirectional service to the second terminal.

6. The first terminal of claim 5,
wherein the first unidirectional service comprises a service transmitting the ambient media in a unidirectional manner.

7. The first terminal of claim 5, wherein the controller is further configured to:
receive, from another terminal, a second service request message for requesting a second unidirectional service,
determine whether to accept the second service request message based on at least one of service priority information or user information,
transmit, when the second service request message is accepted, a release message for releasing the first session,
establish a second session with the other terminal, and
transmit to the other terminal, when the second service request message is not accepted, a reject message for rejecting the second service request message.

8. A method by a server in a communication system, the method comprising:
receiving, from a first terminal, a first service request message including information requesting a first unidirectional service between the first terminal and a second terminal if the first unidirectional service is triggered, the first service request message including a service commencement mode indicating whether the first unidirectional service is to be started automatically or manually;
performing authority authentication to determine whether to accept the first service request message, the authority authentication comprising determining that the first terminal has unidirectional service capability; and
transmitting to the first terminal, when the authority authentication is successful, a message for establishing a first session for the first unidirectional service between the first terminal and the second terminal, the first session being used only for the first terminal to transmit ambient media,
wherein the first unidirectional service is triggered based on at least one sensor of the first terminal,
wherein the first service request message includes a service commencement mode indicating whether the first service request message is to be accepted automatically or manually, and
wherein the first session is established without response of the second terminal if the service commencement mode indicates that the first unidirectional service is to be started automatically.

9. The method of claim 8,
wherein the first unidirectional service comprises a service transmitting the ambient media acquired by the first terminal in a unidirectional manner.

10. The method of claim 8, further comprising:
receiving, from another terminal, a second service request message for requesting a second unidirectional service; and
determining whether to accept the second service request message based on at least one of service priority information or user information.

11. The method of claim 10, further comprising:
transmitting, when the second service request message is accepted, a message for establishing a second session between the first terminal and the second terminal; and
transmitting to the other terminal, when the second service request message is rejected, a reject message for rejecting the second service request message.

12. A server in a communication system, the server comprising:
a transceiver; and
a controller coupled with the transceiver and configured to:
receive, from a first terminal, a first service request message comprising information requesting a first unidirectional service between the first terminal and a second terminal, if the first unidirectional service is triggered, the first service request message including a service commencement mode indicating whether the first unidirectional service is to be started automatically or manually,
perform authority authentication to determine whether to accept the first service request message, and
transmit to the first terminal, when the authority authentication is successful, a message for establishing a first session for the first unidirectional service between the first terminal and the second terminal, the first session being used only for the first terminal to transmit ambient media,
wherein the first unidirectional service is triggered based on at least one sensor of the first terminal,
wherein the first service request message includes a service commencement mode indicating whether the first service request message is to be accepted automatically or manually, and
wherein the first session is established without response of the second terminal if the service commencement mode indicates that the first unidirectional service is to be started automatically.

13. The server of claim 12,
wherein the first unidirectional service comprises a service transmitting the ambient media acquired by the first terminal in a unidirectional manner.

14. The server of claim 12, wherein the controller is further configured to:
receive from another terminal, a second service request message for requesting a second unidirectional service, and
determine whether to accept the second service request message based on at least one of service priority information or user information.

15. The server of claim 14, wherein the controller is further configured to:
transmit, when the second service request message is accepted, a message for establishing a second session between the first terminal and the second terminal requesting the second unidirectional service, and
transmit, to the other terminal, when the second service request message is rejected, a reject message for rejecting the second service request message.

* * * * *